(12) United States Patent
Tsuchida

(10) Patent No.: US 11,293,749 B2
(45) Date of Patent: *Apr. 5, 2022

(54) OPTICAL DISPLACEMENT METER

(71) Applicant: Keyence Corporation, Osaka (JP)

(72) Inventor: Yoshitaka Tsuchida, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 8 days.

This patent is subject to a terminal disclaimer.

(21) Appl. No.: 16/984,179

(22) Filed: Aug. 4, 2020

(65) Prior Publication Data
US 2020/0363191 A1 Nov. 19, 2020

Related U.S. Application Data

(63) Continuation of application No. 16/512,462, filed on Jul. 16, 2019, now Pat. No. 10,767,976.

(30) Foreign Application Priority Data

Aug. 13, 2018 (JP) .............................. JP2018-152480

(51) Int. Cl.
*G01B 11/02* (2006.01)
*G01B 11/24* (2006.01)
(Continued)

(52) U.S. Cl.
CPC ............ *G01B 11/026* (2013.01); *G01B 11/24* (2013.01); *G01S 7/4816* (2013.01); *G01S 7/4817* (2013.01); *G01S 17/48* (2013.01)

(58) Field of Classification Search
CPC ....... G01B 11/026; G01B 11/24; G01B 11/25; G01B 11/2518; G01B 11/2522;
(Continued)

(56) References Cited

U.S. PATENT DOCUMENTS 10,767,976 B2 * 9/2020 Tsuchida ................. G01S 17/48
2009/0046896 A1 2/2009 Yamaguchi et al.
(Continued)

FOREIGN PATENT DOCUMENTS

JP 2012-127887 A 7/2012

OTHER PUBLICATIONS

U.S. Appl. No. 16/512,467, filed Jul. 16, 2019 (63 pages).

*Primary Examiner* — Christina A Riddle
(74) *Attorney, Agent, or Firm* — Kilyk & Bowersox, P.L.L.C.

(57) ABSTRACT

Reflected light from the measurement object is received by a plurality of pixel columns arranged in an X2 direction in a light receiving unit 121, and a plurality of light receiving amount distributions is output. One or a plurality of peak candidate positions of light receiving amounts in a Z2 direction is detected by a peak detection unit 1 for each pixel column based on the plurality of light receiving amount distributions. A peak position to be adopted to a profile is selected from the peak candidate positions detected for each pixel column based on a relative positional relationship with a peak position of another pixel column adjacent to the pixel column, and profile data indicating the profile is generated by the profile generation unit 3 based on the selected peak position.

9 Claims, 17 Drawing Sheets

(51) Int. Cl.
*G01S 17/48* (2006.01)
*G01S 7/481* (2006.01)

(58) Field of Classification Search
CPC ... G01B 11/2527; G01B 11/255; G01B 11/26; G01B 11/30–306; G01B 11/02; G01B 11/14; G01S 7/4816; G01S 7/4817; G01S 7/4811; G01S 7/4815; G01S 17/48
USPC .............. 382/106, 108; 356/600, 601–624, 356/625–640, 399–401, 213, 215, 218
See application file for complete search history.

(56) References Cited

U.S. PATENT DOCUMENTS

| | | |
|---|---|---|
| 2012/0154807 A1 | 7/2012 | Usami |
| 2016/0261791 A1 | 9/2016 | Satoyoshi |
| 2020/0049487 A1 | 2/2020 | Tsuchida |

\* cited by examiner

PROFILE DATA

OPTICAL DISPLACEMENT METER

CROSS-REFERENCE TO RELATED APPLICATIONS

The present application is a continuation of U.S. patent application Ser. No. 16/512,462, filed Jul. 16, 2019, which claims foreign priority based on Japanese Patent Application No. 2018-152480, filed Aug. 13, 2018, the contents of which are incorporated herein by reference.

BACKGROUND OF THE INVENTION

1. Field of the Invention

The present invention relates to an optical displacement meter that detects a displacement of a measurement object by a triangulation method.

2. Description of Related Art

In an optical displacement meter using an optical cutting method, a measurement object (hereinafter, referred to as a workpiece) is irradiated with band-shaped light having a line-shaped cross section from a light projecting unit, and reflected light is received by a two-dimensional light receiving element. A profile of the workpiece is measured based on a position of a peak of a light receiving amount distribution obtained by the light receiving element. Here, the light irradiated onto the workpiece may be multiple-reflected on a surface of the workpiece. In this case, since a plurality of peaks appears in the light receiving amount distribution due to the incidence of the multiple-reflected light on the light receiving element, it is impossible to measure an accurate profile of the workpiece. The same problem occurs when light (disturbance light) from a portion other than the light projecting unit is incident on the light receiving element or when light reflected from a portion other than a measurement target portion of the workpiece is incident on the light receiving element.

In the optical displacement meter described in JP-A-2012-127887, the workpiece is sequentially irradiated with first and second light polarized in directions orthogonal to each other. The first and second light reflected from the workpiece are received by the light receiving element, and first and second waveform data indicating the light receiving amount distributions of the first and second light are generated.

One peak is selected from the first and second waveform data based on a ratio of peaks corresponding to each other between the first and second waveform data. The profile of the workpiece is measured based on a position of the selected peak.

According to the optical displacement meter described in JP-A-2012-127887, it is possible to select the peak due to light reflected only once on the surface of the workpiece from a plurality of peaks in the light receiving amount distribution. However, since it is necessary to provide two light projecting elements that emit the light polarized in the directions orthogonal to each other in the optical displacement meter, an increase in manufacturing costs of the optical displacement meter is caused. In addition, since it is necessary to acquire the first and second waveform data and it is necessary to perform calculation on these waveform data, it is impossible to efficiently measure the profile of the workpiece.

SUMMARY OF THE INVENTION

An object of the present invention is to provide an optical displacement meter capable of efficiently measuring a profile of a measurement object while preventing an increase in manufacturing costs.

(1) An optical displacement meter according to the present invention is an optical displacement meter using an optical cutting method, which measures a profile of a measurement object. The meter includes a light projecting unit that irradiates the measurement object with slit light which spreads in a first direction or spot light scanned in the first direction, a light receiving unit that includes a plurality of pixels arranged in the first direction and a second direction intersecting with the first direction, receives reflected light from each position of the measurement object in the first direction, and outputs a light receiving amount distribution, a peak detection unit that detects one or a plurality of peak candidate positions of light receiving amounts in the second direction for each pixel column based on a plurality of the light receiving amount distributions respectively output from a plurality of the pixel columns arranged in the first direction, and a profile generation unit that selects a peak position to be adopted to the profile based on a relative positional relationship with a peak position of another pixel column adjacent to the pixel column from the peak candidate positions detected by the peak detection unit for each pixel column, and generates profile data indicating the profile based on the selected peak position.

In this optical displacement meter, the slit light that spreads in the first direction or the spot light in the first direction is scanned and is irradiated onto the measurement object by the light projecting unit. The reflected light from the measurement object is received by the plurality of pixel columns arranged in the first direction in the light receiving unit, and the light receiving amount distribution is output. In each pixel column, the plurality of pixels is arranged in the second direction. The peak candidate positions of one or the plurality of light receiving amounts in the second direction are detected by the peak detection unit for each pixel column based on the plurality of light receiving amount distributions output from the plurality of pixel columns. The peak position to be adopted to the profile is selected from the detected peak candidate positions based on the relative positional relationship with the peak position of another adjacent pixel column, and the profile data indicating the profile is generated by the profile generation unit based on the selected peak position.

With this configuration, even when the plurality of peak candidate positions is detected in the light receiving amount distribution corresponding to any pixel column, the peak position to be adopted to the profile is selected for each pixel column based on the relative positional relationship with the peak position of the other pixel column. In this case, it is not necessary to provide a plurality of light projecting elements having different polarization directions in the optical displacement meter. Further, it is not necessary to acquire the plurality of light receiving amount distributions for each pixel column, and therefore, it is not necessary to perform calculation on the plurality of light receiving amount distributions. As a result, it is possible to efficiently measure the profile of the measurement object while preventing an increase in manufacturing costs.

(2) The optical displacement meter may further include a switching unit that switches an operation mode of the profile generation unit between a first operation mode and a second operation mode. In the first operation mode, when the plurality of peak candidate positions in the light receiving amount distribution corresponding to any pixel column is detected by the peak detection unit, the profile generation unit may select the peak position to be adopted in the profile from the plurality of peak candidate positions based on continuity between at least the peak candidate position in the light receiving amount distribution corresponding to a pixel column adjacent to the pixel column in the first direction and the plurality of detected peak candidate positions. In the second operation mode, when the plurality of peak candidate positions is detected in the light receiving amount distribution corresponding to the pixel column by the peak detection unit, the profile generation unit may select the peak position to be adopted to the profile from the plurality of peak candidate positions based on a preset condition.

In some shapes of the measurement object, the peak position selected based on a preset condition may coincide with the position of the surface of the measurement object. In such a case, it is possible to more efficiently measure the profile of the measurement object by selecting the second operation mode.

(3) The preset condition may include a condition in which a peak candidate position having a maximum light receiving amount is selected as the peak position to be adopted to the profile from the plurality of peak candidate positions in each light receiving amount distribution. With this configuration, when the peak candidate position having the maximum light receiving amount coincides with the position of the surface of the measurement object, it is possible to more efficiently measure the profile of the measurement object by selecting the second operation mode.

(4) The preset condition may further include a condition in which a peak candidate position closest to one end or the other end in the second direction is selected as the peak position to be adopted to the profile from the plurality of peak candidate positions in each light receiving amount distribution. With this configuration, when the peak candidate position closest to one end or the other end in the second direction coincides with the position of the surface of the measurement object, it is possible to more efficiently measure the profile of the measurement object by selecting the second operation mode.

(5) The optical displacement meter may further include a parameter acquisition unit that acquires a parameter indicating a mode of a peak in the peak candidate position detected by the peak detection unit. The profile generation unit may select the peak position to be adopted to the profile from the plurality of peak candidate positions in each light receiving amount distribution based on the parameter acquired by the parameter acquisition unit.

In this case, the peak position to be adopted to the profile is selected based on the comprehensive determination using the relative positional relationship between the peak candidate positions of the plurality of pixel columns in the first direction and the mode of the peak. As a result, it is possible to more accurately measure the profile of the measurement object.

(6) The parameter acquired by the parameter acquisition unit may include a light receiving amount of the peak or a width of the peak. In this case, it is possible to easily acquire the parameter indicating the mode of the peak.

(7) The optical displacement meter may further include a cluster generation unit that generates a plurality of clusters each including one or more peak candidate positions from the plurality of peak candidate positions in the plurality of light receiving amount distributions detected by the peak detection unit. Each cluster may include one or more peak candidate positions selected such that a distance between the peak candidate positions adjacent to each other in the first direction is equal to or less than a predetermined value, and the profile generation unit may determine the relative positional relationship based on the number of the peak candidate positions included in each cluster generated by the cluster generation unit. In this case, it is possible to easily determine the relative positional relationship based on the number of peak candidate positions included in each cluster.

(8) The optical displacement meter may further include a distance calculation unit that calculates a distance between each peak candidate position in the light receiving amount distribution corresponding to each pixel column and the peak candidate position in the light receiving amount distribution corresponding to the pixel column adjacent to each pixel column in the first direction. The profile generation unit may determine the relative positional relationship based on the distance calculated by the distance calculation unit. In this case, it is possible to easily determine the relative positional relationship based on the distance between the adjacent peak candidate positions.

(9) The optical displacement meter may further include a pattern generation unit that generates a geometric pattern based on the plurality of peak candidate positions detected by the peak detection unit, and a correlation calculation unit that calculates a correlation coefficient between the geometric pattern generated by the pattern generation unit and the plurality of peak candidate positions detected by the peak detection unit for each pixel column. The profile generation unit may determine the relative positional relationship based on the correlation coefficient calculated by the correlation calculation unit. In this case, it is possible to easily determine the relative positional relationship based on the correlation coefficient between the geometric pattern and the plurality of peak candidate positions.

(10) The optical displacement meter may further include a filter processing unit that performs filter processing on the profile data such that a smoothing effect becomes larger as a change of a value becomes smaller in each portion of the profile data generated by the profile generation unit. In this case, it is possible to smooth the portion of the profile corresponding to the flat portion of the measurement object while maintaining the shape of the stepped portion and the edge portion in the profile.

According to the present invention, it is possible to efficiently measure the profile of the measurement object while preventing an increase in manufacturing costs.

DESCRIPTION OF EMBODIMENTS

[1] First Embodiment (1) Configuration of Optical Displacement Meter

Figure 1:
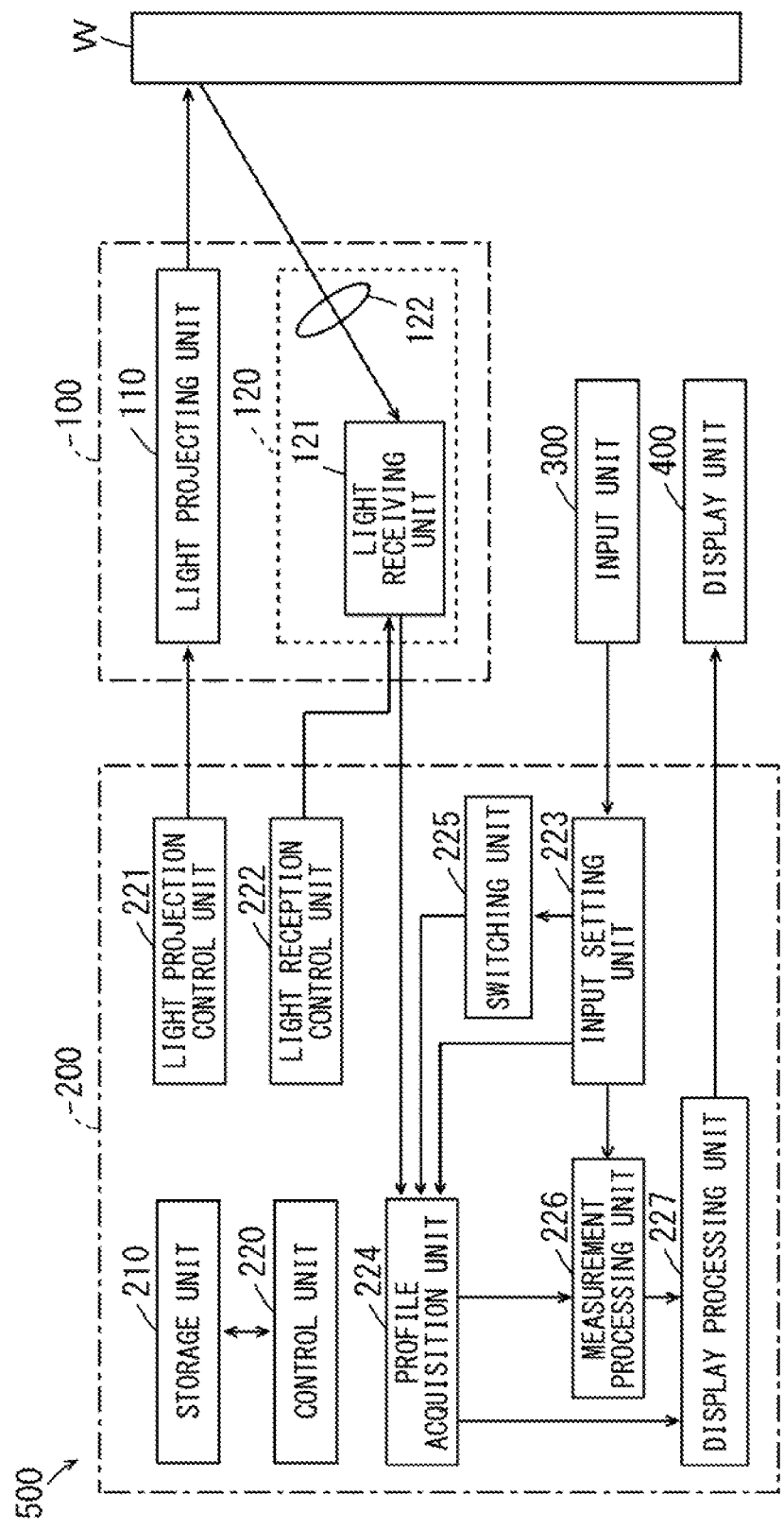
FIG. 1 is a block diagram showing a configuration of an optical displacement meter according to a first embodiment.

Hereinafter, an optical displacement meter using an optical cutting method will be described as an optical displacement meter according to an embodiment of the present invention with reference to the drawings. FIG. 1 is a block diagram showing a configuration of an optical displacement meter according to a first embodiment. As shown in FIG. 1, an optical displacement meter 500 includes an imaging head 100, a processing device 200, an input unit 300, and a display unit 400. The optical displacement meter 500 may include a plurality of imaging heads 100. The imaging head 100 is configured to be detachable from the processing device 200. The imaging head 100 and the processing device 200 may be integrally provided.

The imaging head 100 includes a light projecting unit 110 and an imaging unit 120. The light projecting unit 110 is configured to be able to irradiate a measurement object (hereinafter, referred to as a workpiece W) with band-shaped light that spreads in one direction (an X1 direction to be described later). The light projecting unit 110 may be configured to be capable of irradiating the workpiece W with light scanned in one direction instead of using the band-shaped light that spreads in one direction.

The imaging unit 120 includes a light receiving unit 121 and a light receiving lens 122. Reflected light from the workpiece W passes through the light receiving lens 122, and is incident on the light receiving unit 121. The light receiving unit 121 includes, for example, a complementary metal-oxide-semiconductor (CMOS) sensor, and has a plurality of two-dimensionally arranged pixels. A light receiving amount distribution of the light receiving unit 121 is output as digital data.

The processing device 200 includes a storage unit 210 and a control unit 220. The processing device 200 includes, as functional units, a light projection control unit 221, a light reception control unit 222, an input setting unit 223, a profile acquisition unit 224, a switching unit 225, a measurement processing unit 226, and a display processing unit 227.

The storage unit 210 includes a random access memory (RAM), a read only memory (ROM), a hard disk, a semiconductor memory, or the like, and stores a measurement program. The control unit 220 is, for example, a central processing unit (CPU). The control unit 220 executes the measurement program stored in the storage unit 210, thereby realizing the functional units of the processing device 200. Part or all of the functional units of the processing device 200 may be realized by hardware such as electronic circuits.

The light projection control unit 221 controls a light irradiation timing, light intensity, and the like of the light projecting unit 110. The light reception control unit 222 controls a light receiving timing and the like of the light receiving unit 121. The input setting unit 223 provides a command signal to the profile acquisition unit 224, the switching unit 225, and the measurement processing unit 226 based on the command signal given by the input unit 300.

The profile acquisition unit 224 acquires profile data indicating the profile of the workpiece W based on the light receiving amount distribution output from the light receiving unit 121 and the command signal given from the input setting unit 223. The switching unit 225 switches an operation mode of the profile acquisition unit 224 between a first operation mode and a second operation mode based on the command signal given by the input setting unit 223. Details of the profile acquisition unit 224 and the operation mode will be described later.

The measurement processing unit 226 performs measurement processing on the profile data acquired by the profile acquisition unit 224. Here, the measurement process is a process of calculating a dimension (displacement) of any portion on a surface of the workpiece W based on the profile data. The display processing unit 227 generates image data indicating a shape of the workpiece W based on the profile data and the dimension (displacement) calculated by the measurement processing, and provides the generated image data to the display unit 400.

The input unit 300 includes a keyboard and a pointing device, and is configured to be operable by a user. A mouse, a joystick, or the like is used as the pointing device. A dedicated console may be used as the input unit 300. The user operates the input unit 300, and thus, a command signal is given from the input unit 300 to the input setting unit 223 of the processing device 200.

The display unit 400 is, for example, a liquid crystal display panel or an organic electroluminescence (EL) panel. The display unit 400 displays the profile of the workpiece W and the measurement result by the measurement processing unit 226 based on the image data provided by the display processing unit 227 of the processing device 200.

(2) Overview of Operation

Figure 2:
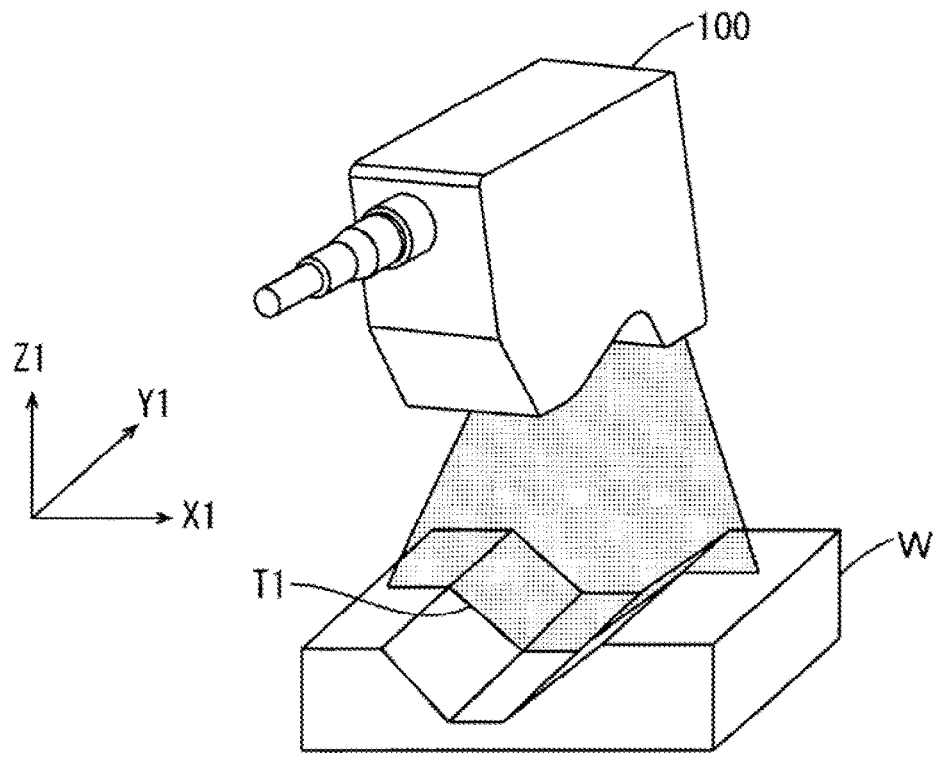
FIG. 2 is an external perspective view of an imaging head and a workpiece.
Figure 3:
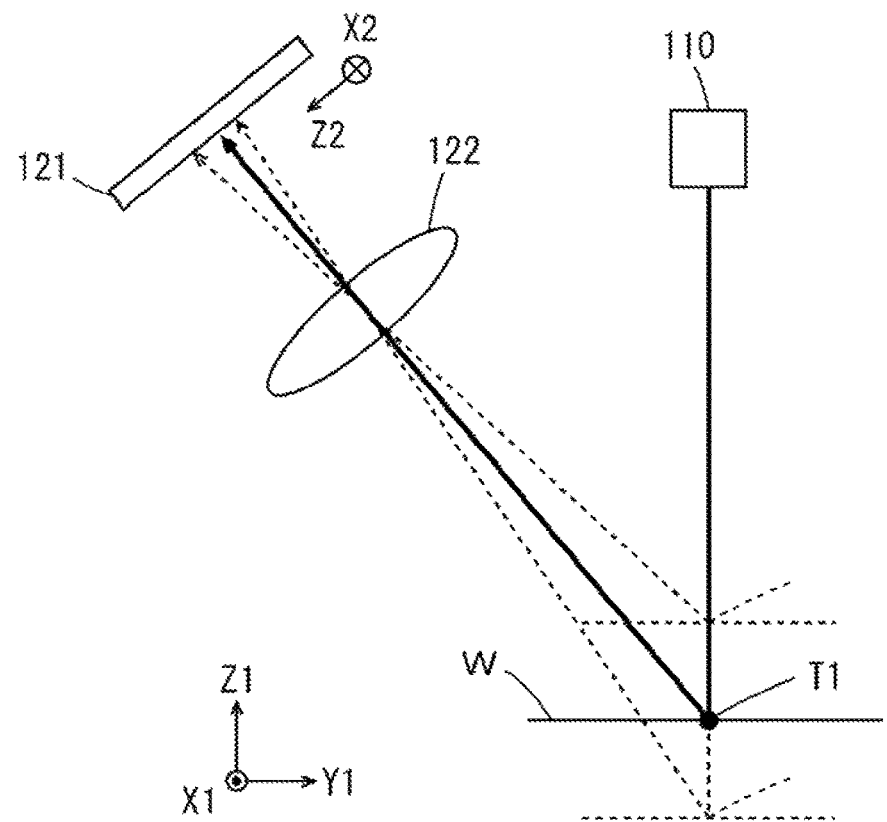
FIG. 3 is a diagram showing the relationship between a light irradiation position on a surface of the workpiece and a light incident position on a light receiving unit.
Figure 4:
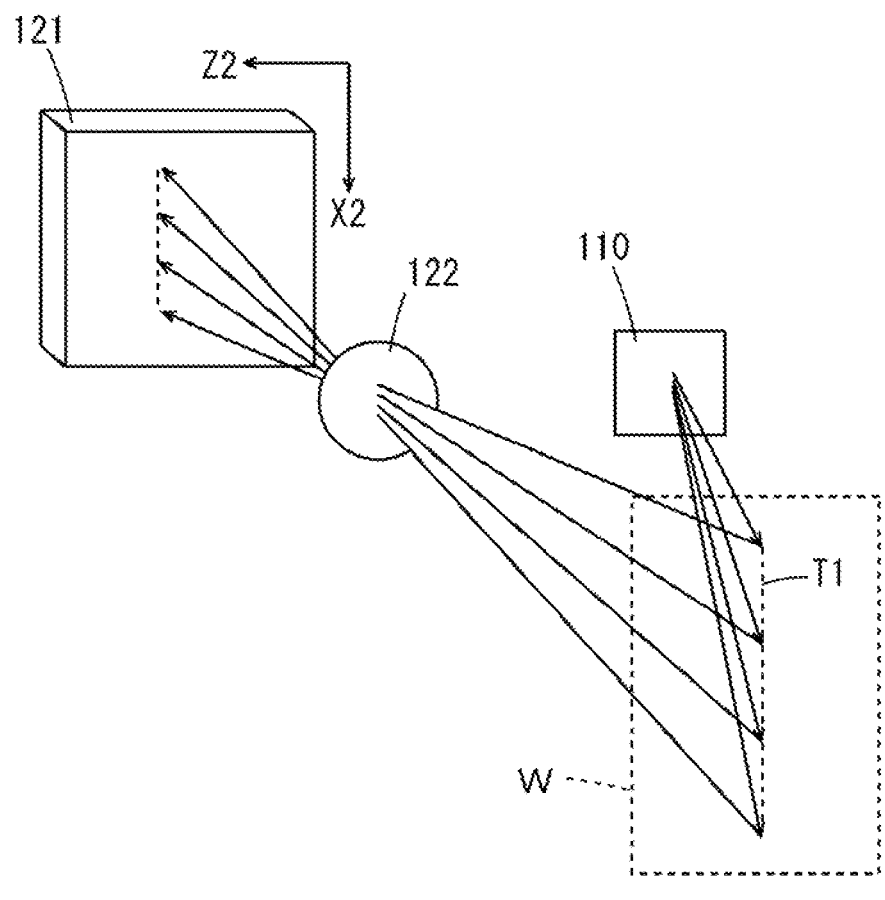
FIG. 4 is a diagram showing the relationship between the light irradiation position on the surface of the workpiece and the light incident position on the light receiving unit.

FIG. 2 is an external perspective view of the imaging head 100 and the workpiece W. FIGS. 3 and 4 are diagrams showing the relationship between a light irradiation position on the surface of the workpiece W and a light incident position on the light receiving unit 121. In FIGS. 2 to 4, two directions orthogonal to each other in a horizontal plane are defined as an X1 direction and a Y1 direction, and are indicated by arrows X1 and Y1, respectively. A vertical direction is defined as a Z1 direction and is indicated by an arrow Z1. In FIGS. 3 and 4, two directions orthogonal to each other on a light receiving surface of the light receiving unit 121 are defined as an X2 direction and a Z2 direction, and are indicated by arrows X2 and Z2, respectively. Here, the light receiving surface is a surface formed by the plurality of pixels of the light receiving unit 121.

In the example of FIG. 2, a groove having a trapezoidal cross section extending in the Y1 direction is formed in the surface of the workpiece W. The imaging head 100 irradiates the surface of the workpiece W with band-shaped light along the X1 direction. Hereinafter, a line-shaped region on the surface of the workpiece W to which the band-shaped light is irradiated is referred to as an irradiation region T1. As shown in FIG. 3, light reflected from the irradiation region T1 passes through the light receiving lens 122, and is incident on the light receiving unit 121. In this case, when a reflection position of the light in the irradiation region T1 is different in the Z1 direction, an incident position of the reflected light to the light receiving unit 121 is different in the Z2 direction.

As shown in FIG. 4, when the reflection position of the light in the irradiation region T1 is different in the X1 direction, the incident position of the reflected light to the light receiving unit 121 is different in the X2 direction. Accordingly, the incident position of the light to the light receiving unit 121 in the Z2 direction represents the position (height) of the irradiation region T1 in the Z1 direction, and the incident position of the light to the light receiving unit 121 in the X2 direction represents the position of the irradiation region T1 in the X1 direction.

Figure 5:
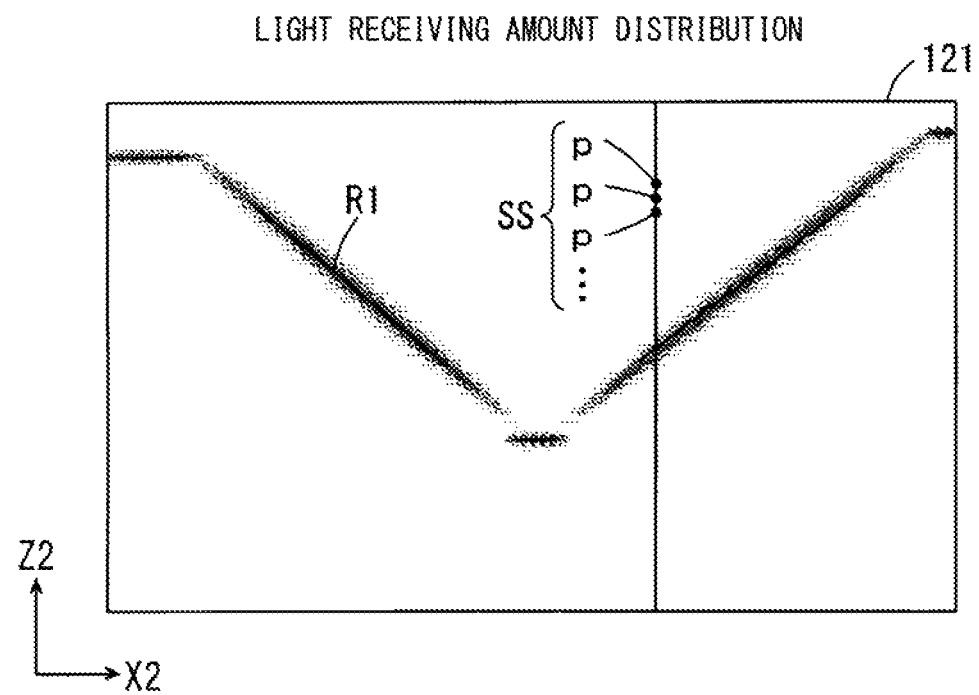
FIG. 5 is a diagram showing a light receiving amount distribution on a light receiving surface of the light receiving unit.

FIG. 5 is a diagram showing a light receiving amount distribution on the light receiving surface of the light receiving unit 121. The light receiving amount distribution is generated based on a light receiving amount of each pixel p of the light receiving unit 121 in FIG. 5. The plurality of pixels p of the light receiving unit 121 is two-dimensionally arranged along the X2 direction and the Z2 direction. Each of columns of the plurality of pixels p along the Z2 direction is referred to as a pixel column SS. Therefore, a plurality of pixel columns SS is arranged in the X2 direction on the light receiving surface of the light receiving unit 121, and each pixel column SS includes the plurality of pixels p along the Z2 direction.

Each pixel p in the present invention is not limited to one pixel (the smallest unit of pixels) of an imaging device such as a CMOS sensor, and may include a plurality of pixels. For example, each pixel p may include four pixels arranged in 2×2, or each pixel p may include nine pixels arranged in 3×3. Therefore, when binning processing is performed with a plurality of pixels as one unit, each pixel p may include a plurality of pixels included in the one unit.

The light reflected from the irradiation region T1 in FIG. 2 is incident on a light receiving region R1 shown in FIG. 5. As a result, a light receiving amount of the light receiving region R1 increases. The light receiving amount distribution of FIG. 5 is output as digital data for each pixel column SS.

Figure 6:
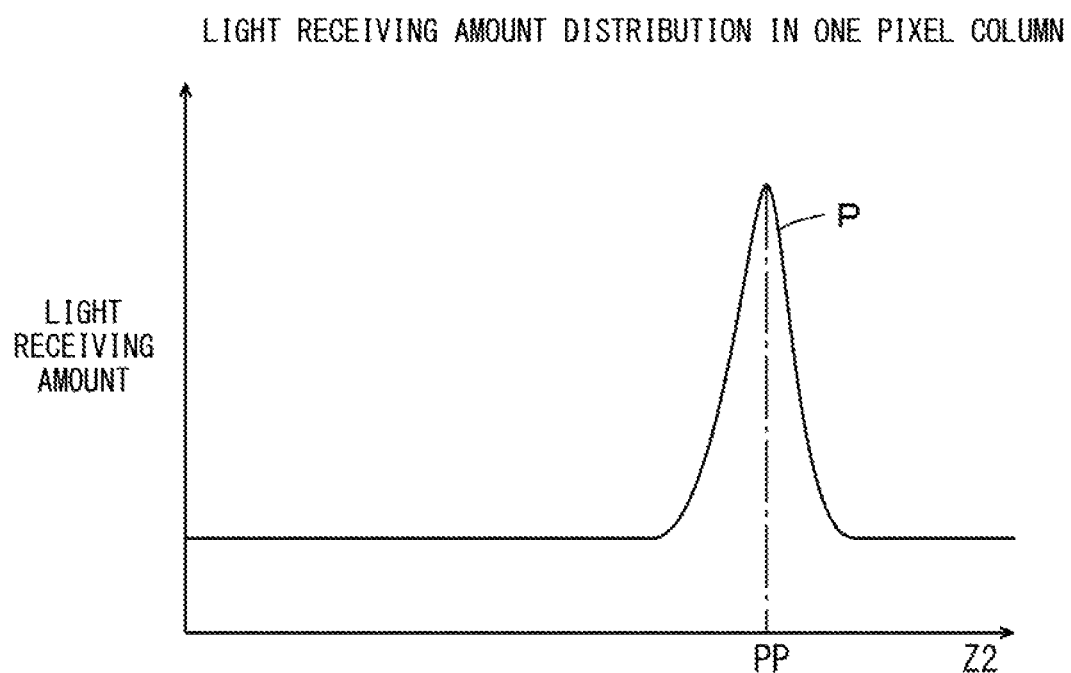
FIG. 6 is a diagram showing a light receiving amount distribution in one pixel column of FIG. 5.

FIG. 6 is a diagram showing a light receiving amount distribution in one pixel column SS of FIG. 5. In FIG. 6, a horizontal axis represents a position in the Z2 direction, and a vertical axis represents a light receiving amount. As shown in FIG. 6, a peak P (local maximum value) corresponding to the light receiving region R1 in FIG. 5 appears in the light receiving amount distribution in one pixel column SS. A position of the peak P in the Z2 direction (hereinafter, referred to as a peak position PP) indicates a height of a surface (reflective surface) of the workpiece W in the irradiation region T1.

One or more peak positions PP (one in the example of FIG. 6) in each of a plurality of light receiving amount distributions corresponding to the plurality of pixel columns SS are detected by the profile acquisition unit 224 of FIG. 1. Profile data indicating the profile of the workpiece W (the shape of the irradiation region T1) is acquired by the profile acquisition unit 224 based on the plurality of peak positions PP.

Figure 7:
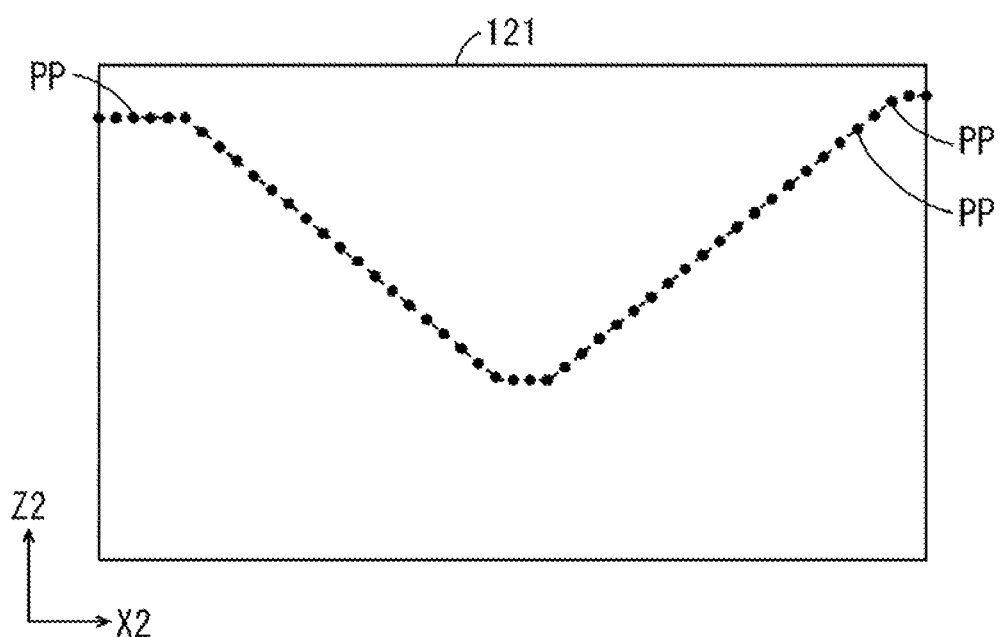
FIG. 7 is a diagram showing all peak positions in the light receiving amount distribution of FIG. 5.
Figure 8:
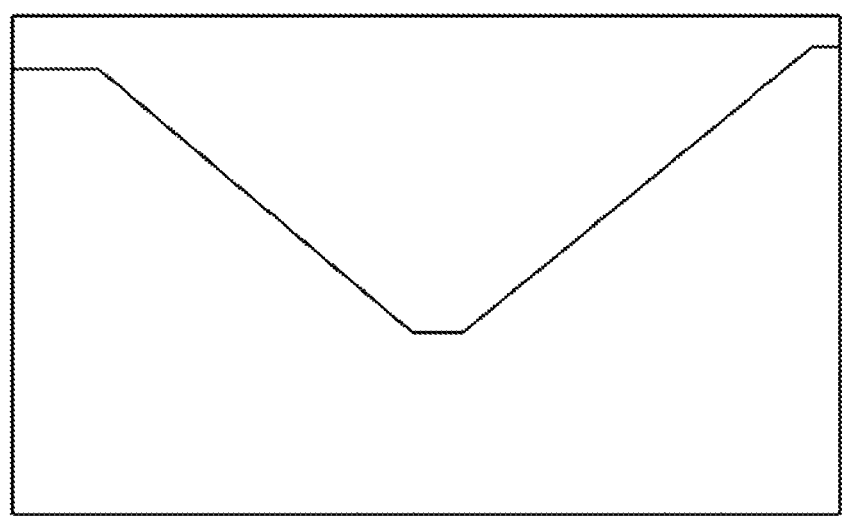
FIG. 8 is a diagram showing profile data acquired based on the peak positions of FIG. 7.

FIG. 7 is a diagram showing all the peak positions PP in the light receiving amount distribution of FIG. 5. FIG. 8 is a diagram showing the profile data acquired based on the peak position PP of FIG. 7. As shown in FIGS. 7 and 8, all the detected peak positions PP are shown as continuous lines, and thus, the profile data indicating the profile of the workpiece W is obtained.

Figure 9A:
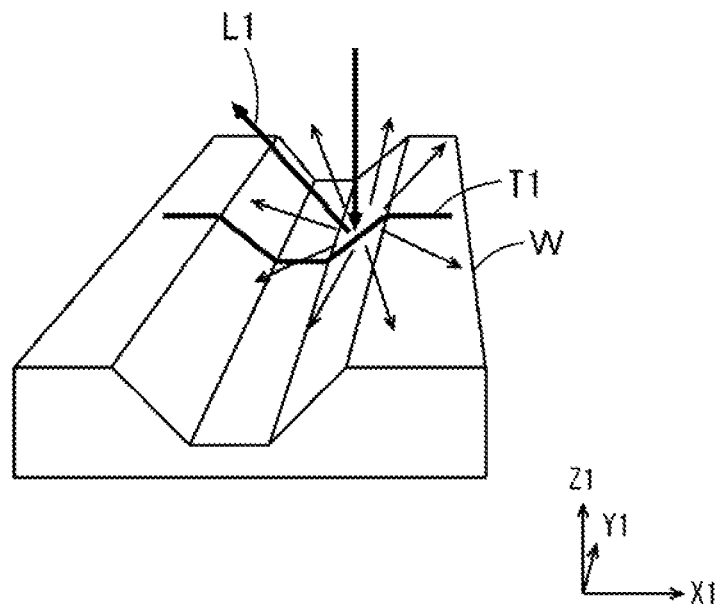
FIGS. 9A and 9B are diagrams for describing reflections on the surface of a workpiece.
Figure 9B:
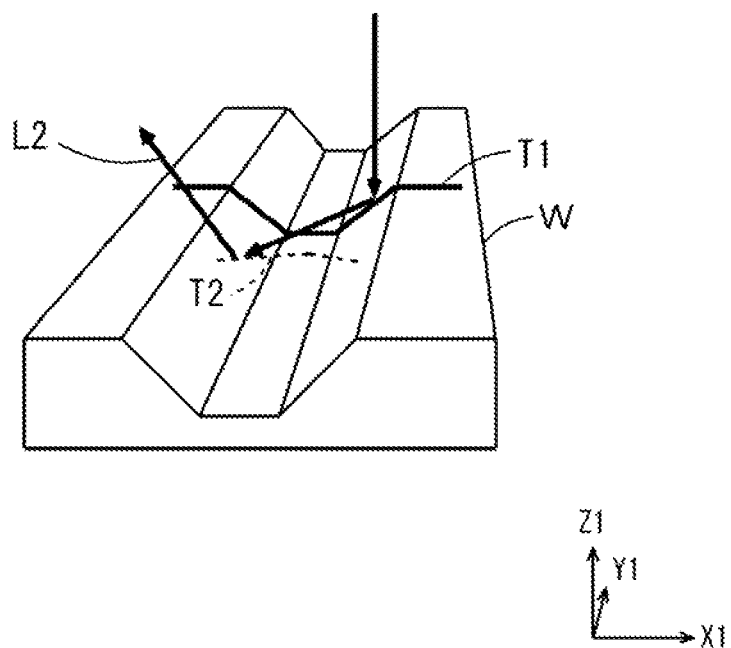
Figure 10:
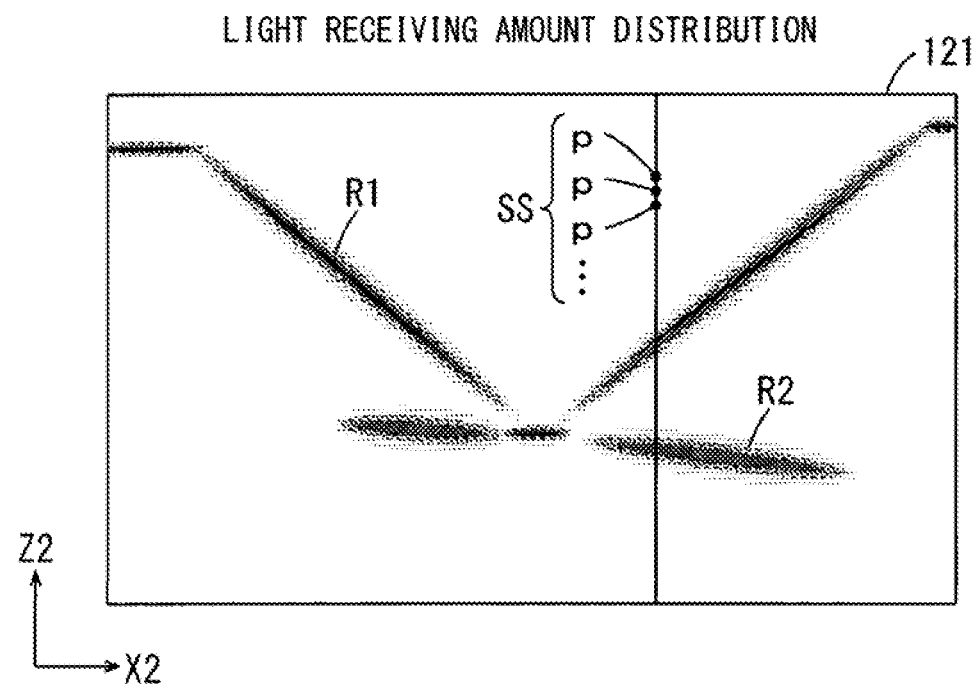
FIG. 10 is a diagram showing another example of the light receiving amount distribution in the light receiving unit.
Figure 11:
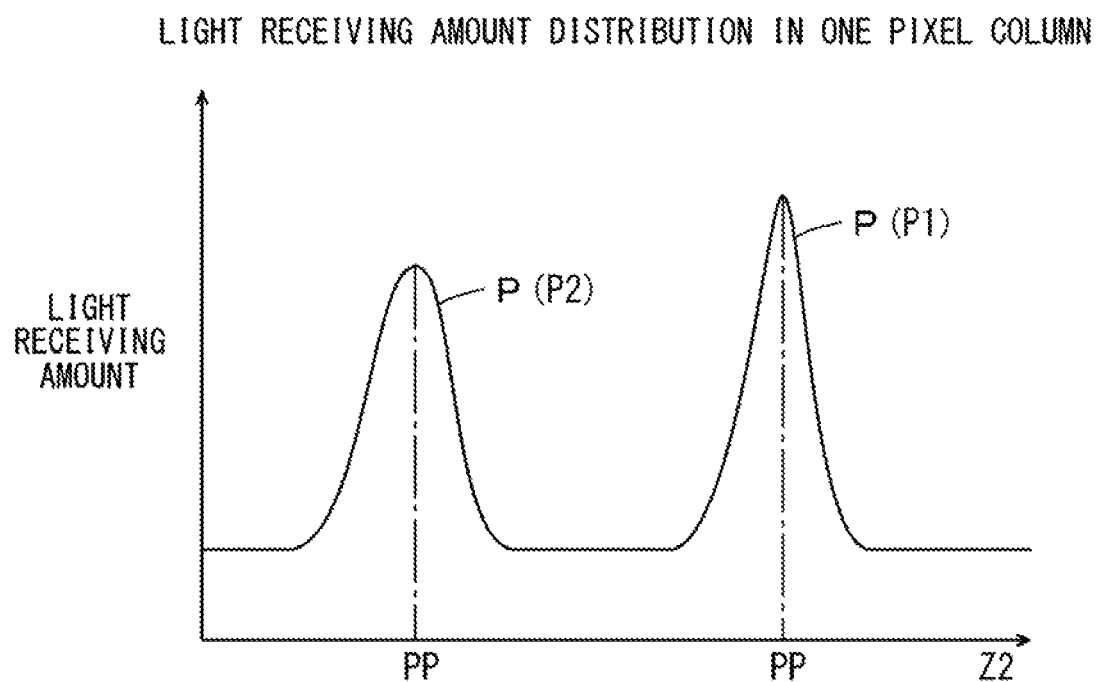
FIG. 11 is a diagram showing the light receiving amount distribution in one pixel column of FIG. 10.

As described above, the light reflected from the irradiation region T1 is incident on the light receiving unit 121, and thus, the peak representing the height of the irradiation region T1 appears in the light receiving amount distribution. However, light reflected from a portion other than the irradiation region T1 may be incident on the light receiving unit 121. In this case, a peak (hereinafter, referred to as a pseudo peak) different from the peak (hereinafter, referred to as a true peak) indicating the height of the irradiation region T1 appears in the light receiving amount distribution. FIGS. 9A and 9B are diagrams for describing reflections on the surface of the workpiece W. FIG. 10 is a diagram showing another example of the light receiving amount distribution in the light receiving unit 121. FIG. 11 is a diagram showing the light receiving amount distribution in one pixel column SS of FIG. 10.

As shown in FIG. 9A, the light irradiated onto the workpiece W is specularly reflected and diffusely reflected from the irradiation region T1. Here, specular reflection refers to reflection in which an incident angle and a reflection angle are equal, and diffuse reflection refers to reflection in which the incident angle and the reflection angle are different. Normally, light specularly reflected from the irradiation region T1 is not incident on the light receiving unit 121, and a part of light L1 diffusely reflected from the irradiation region T1 is incident on the light receiving unit 121. On the other hand, as shown in FIG. 9B, some other light L2 diffusely reflected from the irradiation region T1 may be specularly reflected from another region other than the irradiation region T1 on the surface of the workpiece W (hereinafter, referred to as a pseudo irradiation region T2), and may be incident on the light receiving unit 121.

When the light is specularly reflected, the intensity of the light does not greatly change before and after the reflection. Therefore, a large difference is not generated between the intensity of the light L1 incident on the light receiving unit 121 from the irradiation region T1 and the intensity of the light L2 incident on the light receiving unit 121 from the pseudo irradiation region T2. The present embodiment is an example, and such multiple reflections (reflections caused by multiple times) can be caused under various circumstances. For example, when the workpiece W and the imaging head 100 are arranged such that the specularly reflected light is received by the light receiving unit 121 as the reflected light from the workpiece W, the diffusely reflected light other than the specularly reflected light may be further reflected from another region, and may be received by the light receiving unit 121.

In this case, as shown in FIG. 10, a light receiving amount of another region (hereinafter, referred to as a pseudo light receiving region R2) other than the light receiving region R1 increases on the light receiving surface of the light receiving unit 121. Therefore, in addition to the true peak P1 which is the peak P corresponding to the light receiving region R1, a pseudo peak P2 which is the peak P corresponding to the pseudo light receiving region R2 appears in the light receiving amount distribution, as shown in FIG. 11. That is, the position of the true peak P1 and the position of the pseudo peak P2 are detected by the profile acquisition unit 224, as candidate positions of the peak P (hereinafter, referred to as peak candidate positions). When the position of the pseudo peak P2 is used instead of the position of the true peak P1, accurate profile data cannot be obtained.

In addition, light (disturbance light) from a portion other than the light projecting unit 110 may be incident on the light receiving unit 121. Alternatively, light irradiated onto a portion other than the irradiation region T1 of the workpiece W may be reflected, and may be incident on the light receiving unit 121. In these cases, the pseudo peak P2 in addition to the true peak P1 also appears in the light receiving amount distribution, and thus, the same problem occurs.

Therefore, the profile acquisition unit 224 selectively operates in the first operation mode or the second operation mode. In the first operation mode, not the position of the pseudo peak P2 but the position of the true peak P1 is selected as the peak position PP based on a relative positional relationship (for example, continuity) between a peak candidate position in a light receiving amount distribution corresponding to an adjacent pixel column SS to the pixel column SS and the plurality of detected peak candidate positions. In the second operation mode, one peak candidate position is selected as the peak position PP from a plurality of peak candidate positions based on a preset condition.

Hereinafter, the operation of the profile acquisition unit 224 will be described in detail. In the following description, the peak candidate position in the light receiving amount distribution corresponding to the pixel column SS is simply referred to as the peak candidate position of the pixel column SS.

(3) Profile Acquisition Unit

Figure 12:
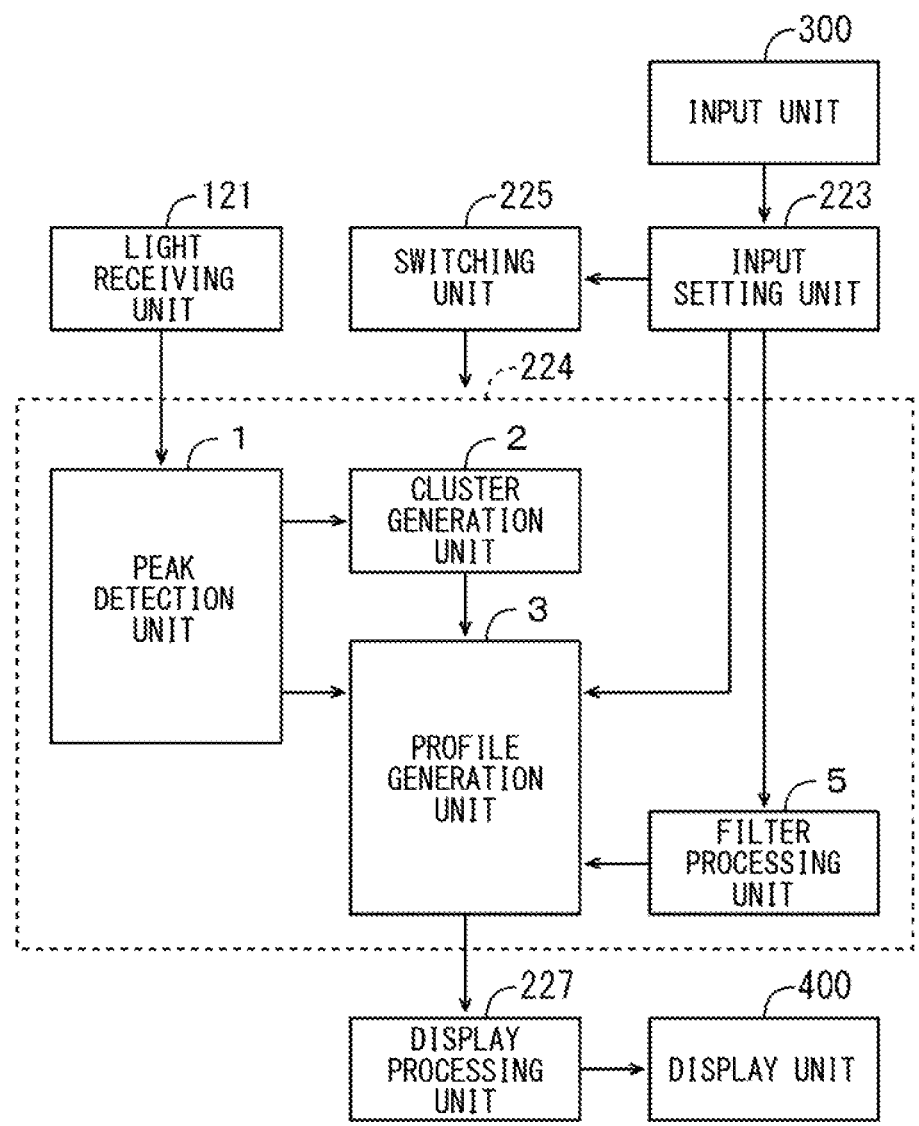
FIG. 12 is a block diagram showing a configuration of a profile acquisition unit.

FIG. 12 is a block diagram showing a configuration of the profile acquisition unit 224. As shown in FIG. 12, the profile acquisition unit 224 includes, as functional units, a peak detection unit 1, a cluster generation unit 2, a profile generation unit 3, and a filter processing unit 4. The control unit 220 of FIG. 1 executes the measurement program stored in the storage unit 210, thereby realizing the functional units of the profile acquisition unit 224. Part or all of the functional units of the profile acquisition unit 224 may be realized by hardware such as an electronic circuit.

In the first and second operation modes, the peak detection unit 1 detects the peak (including the peak candidate positions. The same applies later.) of each pixel column SS based on the light receiving amount distribution output from the light receiving unit 121. In the first operation mode, the cluster generation unit 2 generates a plurality of clusters from the plurality of peak candidate positions detected by the peak detection unit 1. Here, each cluster includes one or more peak candidate positions selected such that a distance between the peak candidate positions adjacent to each other in the X2 direction is equal to or less than a predetermined value.

In the first operation mode, the profile generation unit 3 selects the peak position PP corresponding to the position of the surface of the workpiece W from the plurality of peak candidate positions in each light receiving amount distribution based on the number of peak candidate positions included in each cluster generated by the cluster generation unit 2. In the present embodiment, the peak candidate position included in the largest cluster is selected as the peak position PP. The size of the cluster means the number of peak candidate positions included in the cluster.

In the second operation mode, the profile generation unit 3 selects one peak position PP from the plurality of peak candidate positions in each light receiving amount distribution based on a preset condition. The preset condition includes "STANDARD (maximum peak)", "NEAR", and "FAR". In "STANDARD (maximum peak)", the peak candidate position having the maximum light receiving amount is selected as the peak position PP from the plurality of peak candidate positions in each light receiving amount distribution. In the example of FIG. 11, the position of the true peak P1 having the maximum light receiving amount is selected as the peak position PP from the two peaks P.

In "NEAR", the peak candidate position closest to one end (for example, left end) in the Z2 direction is selected as the peak position PP from the plurality of peak candidate positions in each light receiving amount distribution. In the example of FIG. 11, the position of the pseudo peak P2 appearing on the leftmost side is selected as the peak position PP from the two peaks P. In "FAR", the peak candidate position closest to the other end (for example, right end) in the Z2 direction is selected as the peak position PP from the plurality of peak candidate positions in each light receiving amount distribution. In the example of FIG. 11, the position of the true peak P1 appearing on the rightmost side is selected as the peak position PP from the two peaks P.

The user operates the input unit 300, and thus, any one of "STANDARD (maximum peak)", "NEAR", and "FAR" can be set by the input setting unit 223. In some shapes of the workpiece W, the peak position PP selected based on any condition may coincide with the position of the surface of the workpiece W. Therefore, when the user recognizes an appropriate condition corresponding to the shape of the workpiece W, it is possible to more efficiently select an appropriate peak position PP corresponding to the position of the surface of the workpiece W by setting the condition in the second operation mode.

Further, the profile generation unit 3 generates the profile data indicating the profile of the workpiece W based on the selected peak position PP. The filter processing unit 4 performs filter processing on the profile data such that a smoothing effect becomes larger as a change of a value becomes smaller at each portion of the profile data generated by the profile generation unit 3. The details of the filter processing unit 4 will be described later. The profile based on the profile data generated by the profile generation unit 3 is displayed on the display unit 400 through the display processing unit 227.

Figure 13:
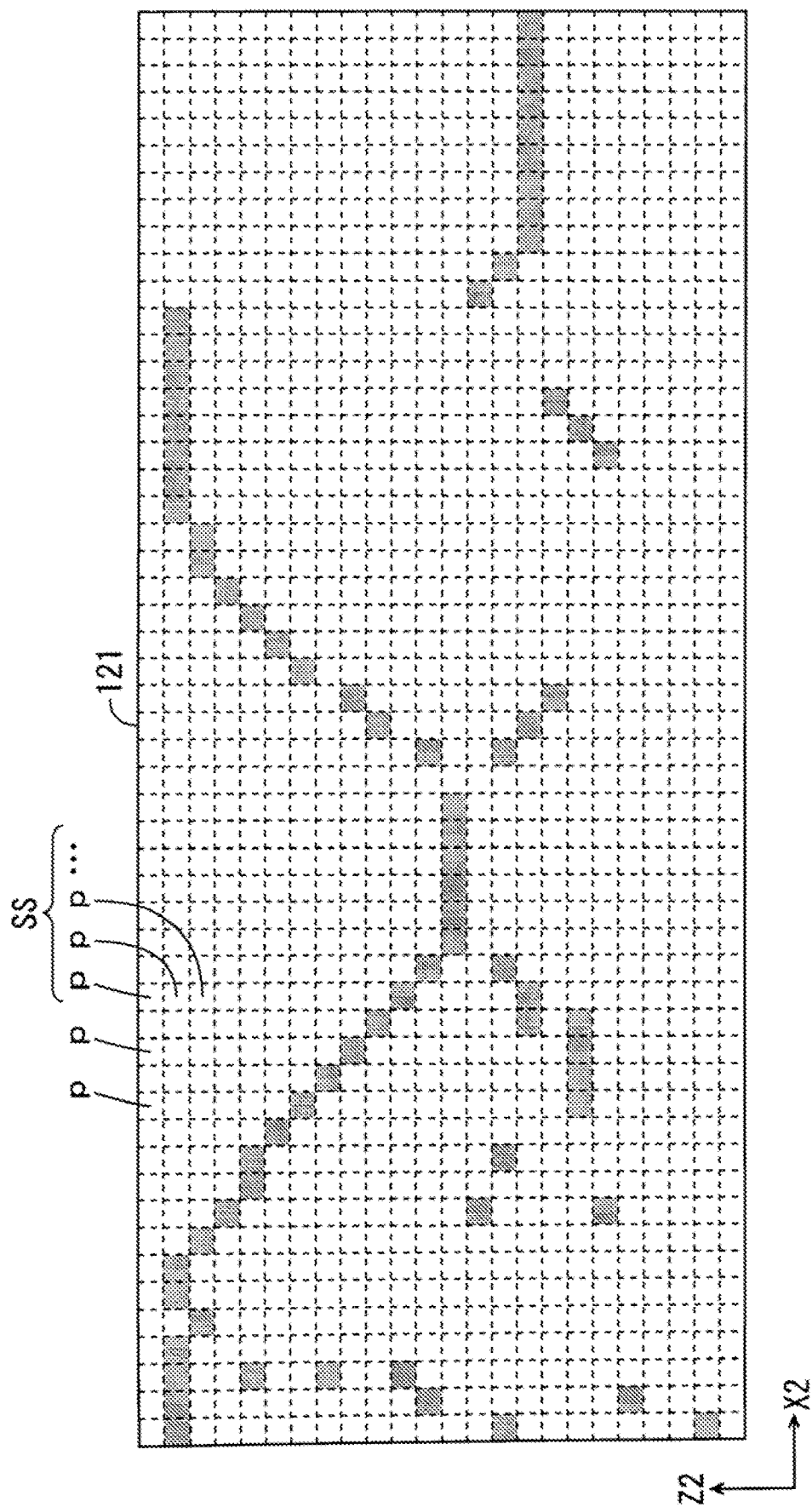
FIG. 13 is a diagram for describing an operation of the profile acquisition unit in a first operation mode.
Figure 14:
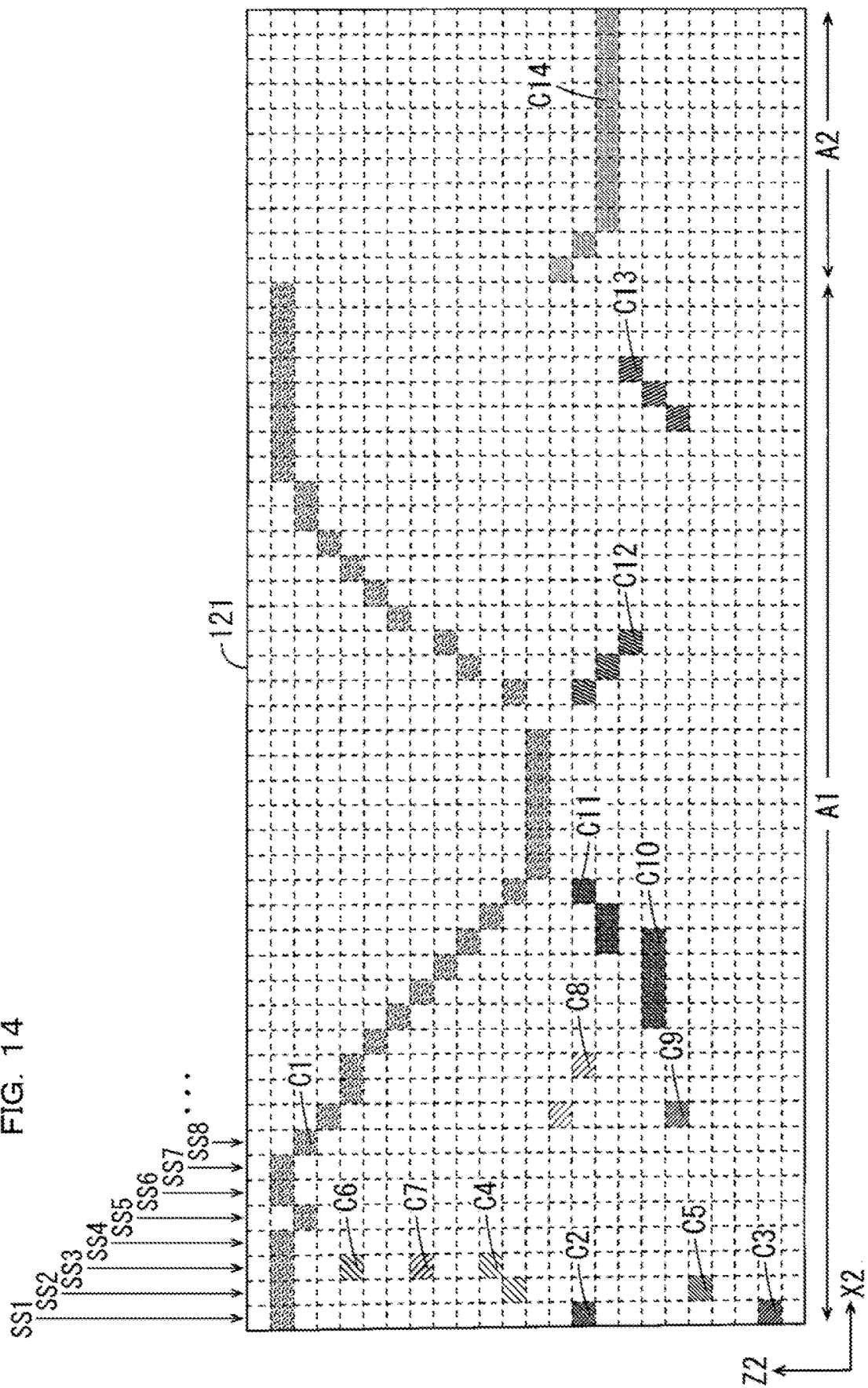
FIG. 14 is a diagram for describing the operation of the profile acquisition unit in the first operation mode.
Figure 15:
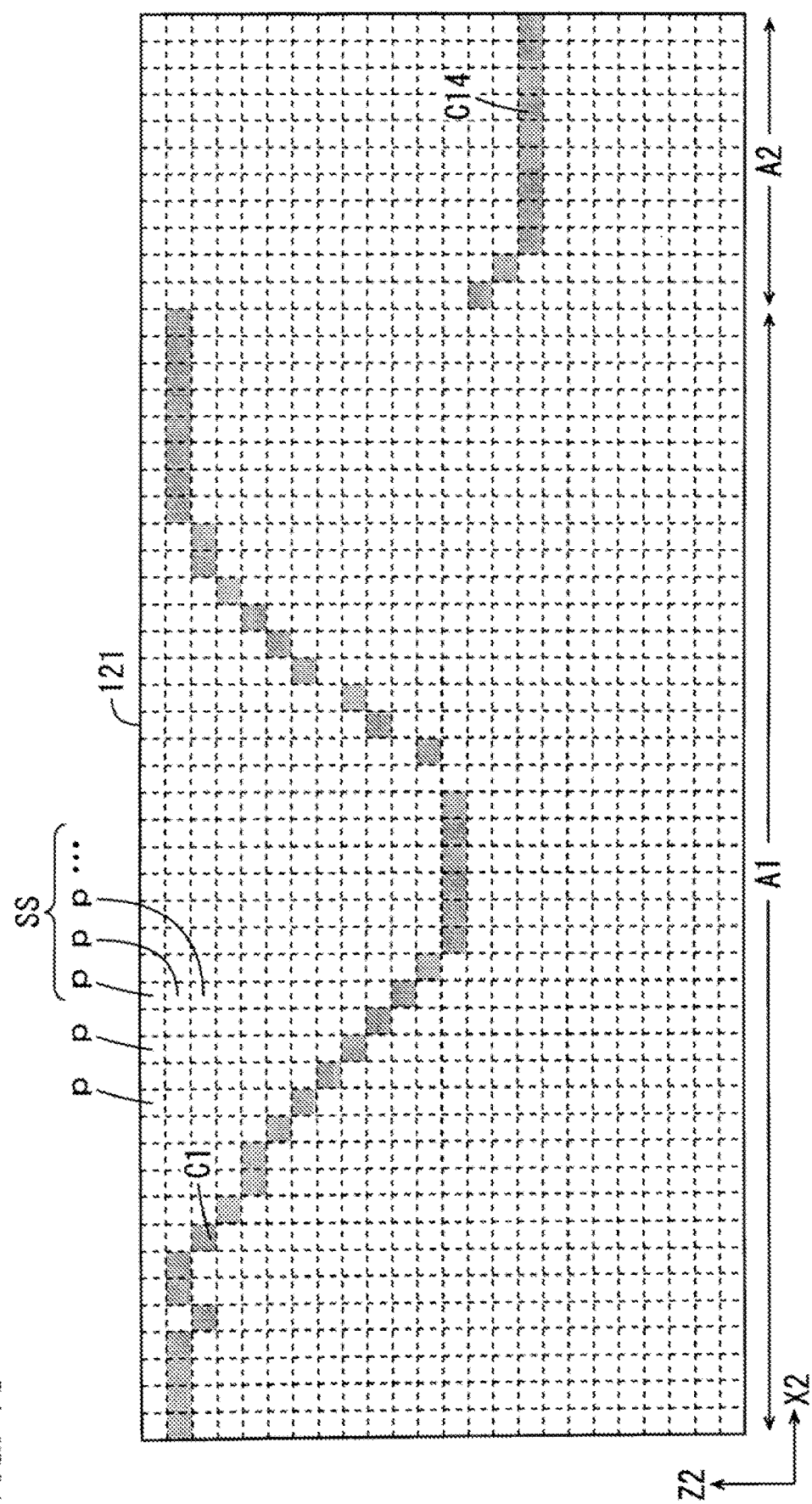
FIG. 15 is a diagram for describing the operation of the profile acquisition unit in the first operation mode.

FIGS. 13, 14, and 15 are diagrams for describing the operation of the profile acquisition unit 224 in the first operation mode. As described above, the peak detection unit 1 of FIG. 12 detects the peak candidate positions of each pixel column SS. In the example of FIG. 13, the pixel p of the light receiving unit 121 corresponding to the detected peak candidate position is indicated by a dot pattern. As shown in FIG. 13, the plurality of peak candidate positions is detected in some pixel columns SS.

The cluster generation unit 2 of FIG. 12 generates the plurality of clusters from the plurality of peak candidate positions detected by the peak detection unit 1. A plurality of peak candidate positions adjacent to each other in the X2 direction is included in the same cluster. The two peak candidate positions included in the same cluster are not necessarily adjacent to each other in the X2 direction. A predetermined peak candidate position and a peak candidate position within a predetermined distance from the predetermined peak candidate position may be included in the same cluster.

In the example of FIG. 14, 14 clusters C1 to C14 are generated from the plurality of peak candidate positions, and the clusters C1 to C14 are indicated by different dot patterns or hatching patterns. The cluster C1 is the largest cluster, the cluster C14 is the second largest cluster, and the clusters C2, C3, C5 to C7, and C9 are the smallest clusters. In FIG. 14, the plurality of pixel columns SS arranged in the X2 direction is referred to as pixel columns SS1, SS2, SS3, . . . , in order from the left side.

In the pixel column SS1, three peak candidate positions are detected, and are included in the clusters C1, C2, and C3, respectively. In the pixel column SS2, three peak candidate positions are detected and included in the clusters C1, C4, and C5, respectively. In the pixel column SS3, four peak candidate positions are detected and included in the clusters C1, C4, C6, and C7, respectively. In these cases, the peak candidate position included in the largest cluster C1 is selected as the peak position PP by the profile generation unit 3 of FIG. 12.

In the pixel columns SS4 to SS8, only one peak candidate positions included in the cluster C1 is detected. In these cases, the peak candidate position is selected as the peak position PP by the profile generation unit 3.

Similarly, as shown in FIG. 15, in the pixel columns SS of a region A1 of the light receiving unit 121 in the X2 direction, the peak candidate position included in the cluster C1 is selected as the peak position PP. In the pixel columns SS of a region A 2 of the light receiving unit 121 in the X2 direction, the peak candidate position included in the cluster C14 is selected as the peak position PP. In the example of FIG. 15, the pixels p of the light receiving unit 121 corresponding to the selected peak positions PP are indicated by the dot patterns. The profile data is generated by the profile generation unit 3 of FIG. 12 based on the selected peak positions PP.

(4) Modification Example

Although it has been described in the present embodiment that the peak candidate position included in the largest cluster is selected as the peak position PP, the present invention is not limited thereto. The peak position PP may be selected based on the comprehensive determination using the number of peak candidate positions included in the cluster and another parameter indicating a mode of the peak candidate.

Figure 16:
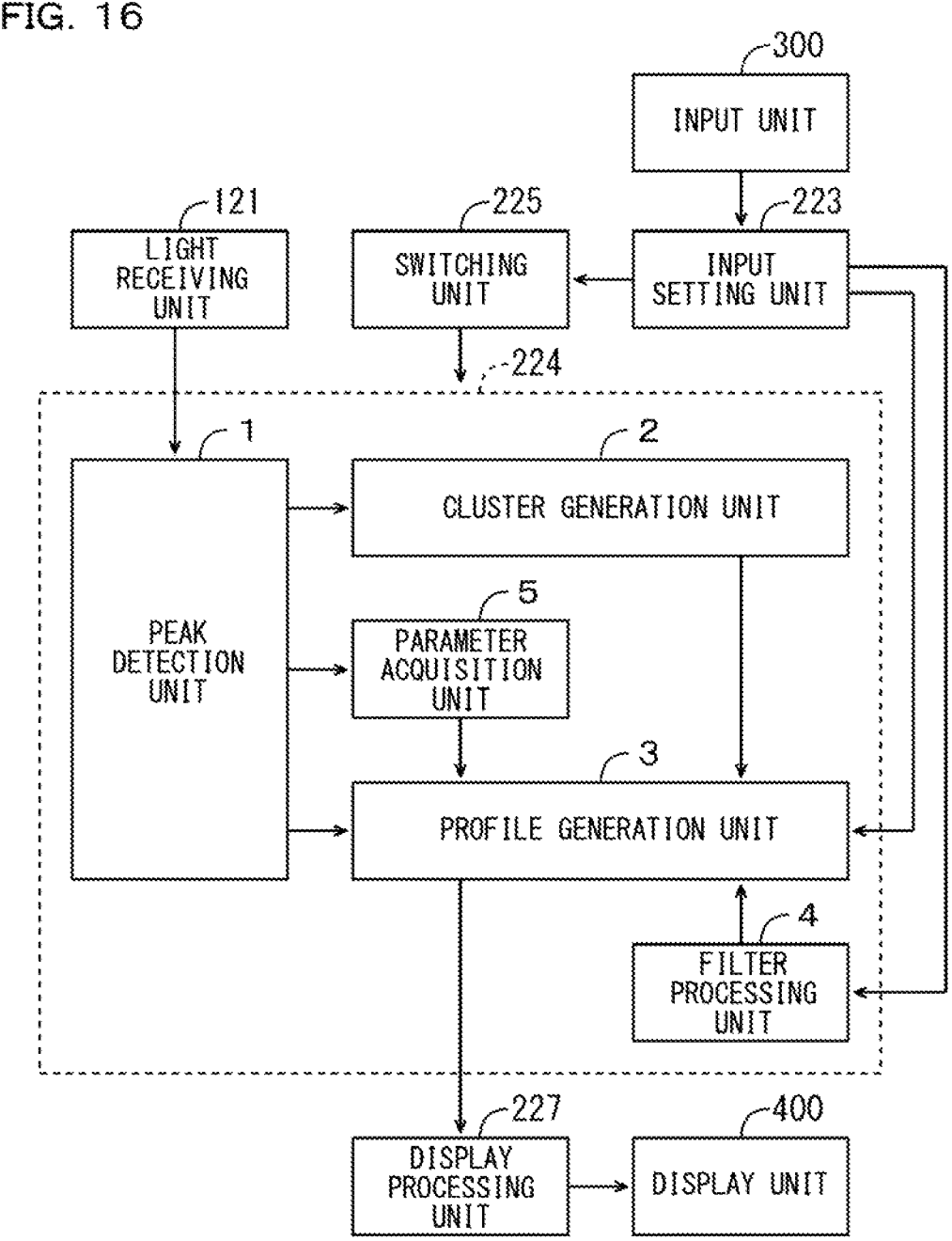
FIG. 16 is a block diagram showing a configuration of a profile acquisition unit according to a modification example.

FIG. 16 is a block diagram showing a configuration of a profile acquisition unit 224 according to a modification example. Differences between the profile acquisition unit 224 of FIG. 16 and the profile acquisition unit 224 of FIG. 12 will be described. As shown in FIG. 16, the profile acquisition unit 224 according to the modification example further includes a parameter acquisition unit 5. In the first operation mode, the parameter acquisition unit 5 acquires a plurality of parameters respectively indicating modes of the plurality of candidate peaks P detected by the peak detection unit 1.

Specifically, a light receiving amount of the true peak P1 tends to be larger than a light receiving amount of the pseudo peak P2. Alternatively, a width of the true peak P1 tends to be narrower than a width of the pseudo peak P2. Therefore, the parameter acquisition unit 5 acquires, for example, a light receiving amount of the candidate of the peak P or a width of the candidate of the peak P, as the above-mentioned parameters.

The profile generation unit 3 comprehensively determines the number of peak candidate positions included in each cluster generated by the cluster generation unit 2 and the light receiving amount of the candidate of the peak acquired by the parameter acquisition unit 5 or the width of the candidate of the peak. As a result of the determination, the profile generation unit 3 selects any one cluster, and selects the peak candidate position included in the selected cluster, as the peak position PP.

(5) Filter Processing Unit

Figure 17A:
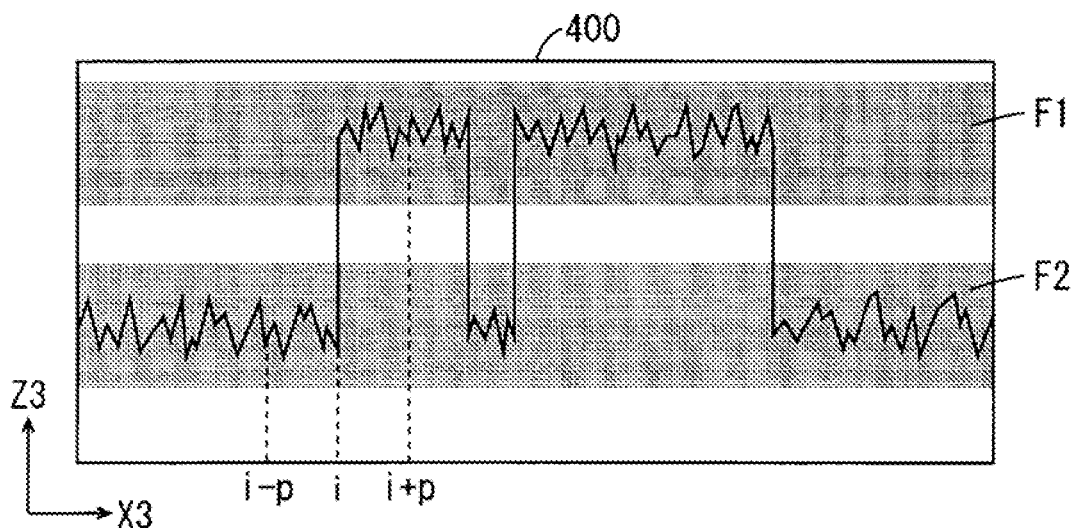
FIGS. 17A to 17C are diagrams for describing an operation of a filter processing unit of FIG. 12.
Figure 17B:
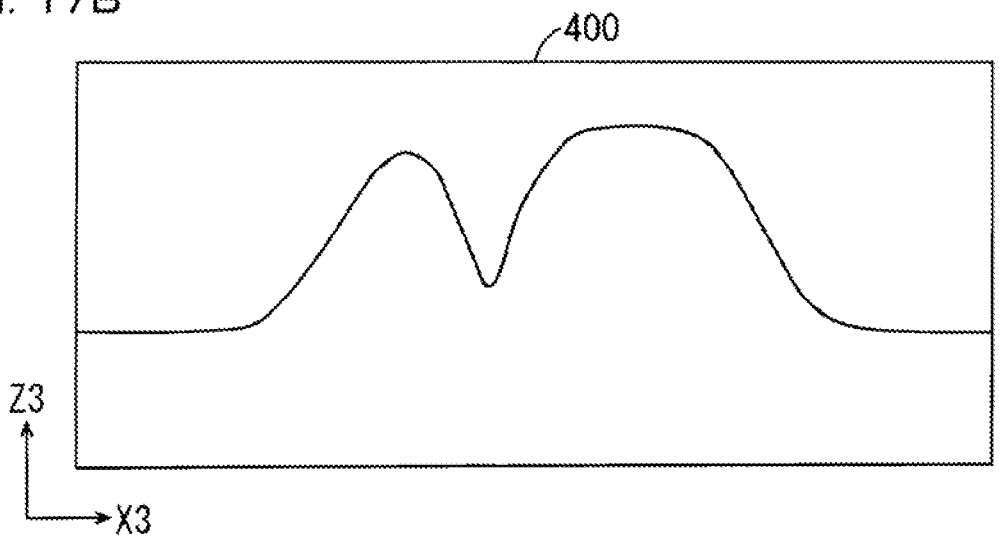
Figure 17C:
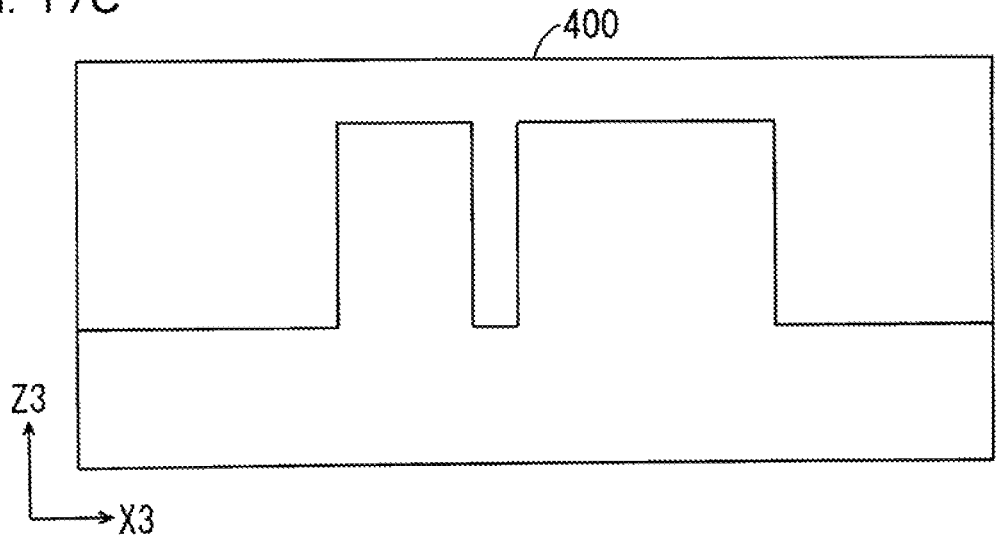

FIGS. 17A to 17C are diagrams for describing an operation of the filter processing unit 4 of FIG. 12. In FIGS. 17A to 17C, the profile of the workpiece W is displayed on the display unit 400. An X3 direction and a Z3 direction which respectively correspond to the X2 direction and the Z2 direction of the light receiving unit 121 of FIG. 1 are defined on the screen of the display unit 400.

Even when the portion of the workpiece W is flat, the portion of the profile of the workpiece W based on the profile data may not be flat and may be jagged, as shown in FIG. 17A, in some states, color unevenness, or the like of the surface of the workpiece W. When smoothing filter processing is performed on the profile data in order to smooth the portion of the profile of the workpiece W, a stepped portion or an edge portion of the profile disappears as shown in FIG. 17B, and an accurate profile may not be obtained.

Therefore, in the present embodiment, the filter processing unit 4 calculates an output value $f_i$ by calculating the following Expression (1). Here, assuming that the plurality of pixel columns SS arranged in the X3 direction is numbered by i-th (i is an integer of 1 or more) in order from the left side, $z_i$ in Expression (1) is a position (height) of a portion of the profile data in the Z3 direction, which corresponds to the i-th pixel column SS. α is a weighting parameter in the Z3 direction. k is an integer of 1 or more, and represents a range (kernel) in which the calculation is performed for the numbers i.

$$f_i = \frac{\sum_{j=i-k}^{i+k} e^{-\alpha(z_i-z_j)^2} \cdot z_j}{\sum_{j=i-k}^{i+k} e^{-\alpha(z_i-z_j)^2}} \quad (1)$$

The output value $f_i$ of Expression (1) is calculated for all the numbers i, and thus, the filter processing is performed on the profile data such that a smoothing effect at a portion of the profile at which a height change is smaller is larger than a smoothing effect at a portion at which the height change becomes larger. As a result, the profile is smoothed while shapes of the stepped portion and the edge portion are maintained, as shown in FIG. 17C.

The filter processing unit 4 may calculate the output value $f_i$ by calculating the following Expression (2) instead of Expression (1). Here, $x_i$ in Expression (2) is a position of a portion of the profile data in the X3 direction which corresponds to the i-th pixel column SS. β is a weighting parameter in the X3 direction. Other parameters are the same as the parameters in Expression (1).

$$f_i = \frac{\sum_{j=i-k}^{i+k} e^{-\beta(x_i-x_j)^2} \cdot e^{-\alpha(z_i-z_j)^2} \cdot z_j}{\sum_{j=i-k}^{i+k} e^{-\beta(x_i-x_j)^2} \cdot e^{-\alpha(z_i-z_j)^2}} \quad (2)$$

The output value $f_i$ of Expression (2) is calculated for all the numbers i, and thus, the filter processing is performed on the profile data such that a smoothing effect at a portion of the profile at which the height change is smaller is larger than a smoothing effect at a portion at which the height change becomes larger. The filter processing is performed on the profile data such that a smoothing effect between portions of the profile which are adjacent to each other in the X3 direction is larger than a smoothing effect between portions which are spaced apart from each other in the X3 direction.

In addition, the user can specify the range of the profile data to be subjected to the filter processing in the Z3 direction by operating the input unit 300. It is also possible to specify a plurality of ranges in which the filter processing is performed. FIG. 17A shows an example in which two ranges F1 and F2 to be subjected to the filter processing are specified by dot patterns.

In Expression (1) or Expression (2), the kernel k may be set as a Gaussian kernel in the input setting unit 223 of FIG. 1 or may be set in the input setting unit 223 by the user who operates the input unit 300 of FIG. 1. Alternatively, when the measurement processing unit 226 of FIG. 1 is set so as to measure a predetermined stepped portion of the profile, the kernel k may be automatically set in the input setting unit 223 according to the size of the stepped portion.

(6) Effects

In the optical displacement meter 500 according to the present embodiment, the workpiece W is irradiated with the light by the light projecting unit 110. The reflected light from the workpiece W is received by the plurality of pixel columns SS arranged in the X2 direction in the light receiving unit 121, and the light receiving amount distribution is output. One or the plurality of peak candidate positions of the light receiving amount in the Z2 direction in which the plurality of pixels p of the corresponding pixel column SS is arranged is detected by the peak detection unit 1 in each of the plurality of light receiving amount distributions. The peak position PP to be adopted to the profile is selected from the peak candidate positions detected for each pixel column SS based on the relative positional relationship with the peak position PP of another pixel column SS adjacent to the pixel column SS, and the profile data indicating the profile of the workpiece W is generated by the profile generation unit 3 based on the selected peak position PP.

With this configuration, even when the plurality of peak candidate positions is detected for any pixel column SS, the peak position PP to be adopted to the profile is selected for the pixel column SS based on the relative positional relationship with the peak position PP of the other pixel column SS. In this case, it is not necessary to provide a plurality of light projecting elements having different polarization directions in the optical displacement meter 500. Further, it is not necessary to acquire the plurality of light receiving amount distributions for each pixel column SS. Therefore, it is not necessary to perform the calculation on the plurality of light receiving amount distributions. As a result, it is possible to efficiently measure the profile of the workpiece W while preventing an increase in manufacturing costs.

In the determination of the relative positional relationship, the plurality of clusters each including one or more peak candidate positions is generated by the cluster generation unit 2 from the plurality of peak candidate positions in the plurality of detected light receiving amount distributions. Each cluster includes one or more peak candidate positions selected such that the distance between the peak candidate positions adjacent to each other in the X2 direction is equal to or less than the predetermined value. The relative positional relationship is determined by the profile generation unit 3 based on the number of peak candidate positions included in each generated cluster. In this case, it is possible to easily determine the relative positional relationship.

[2] Second Embodiment

Figure 18:
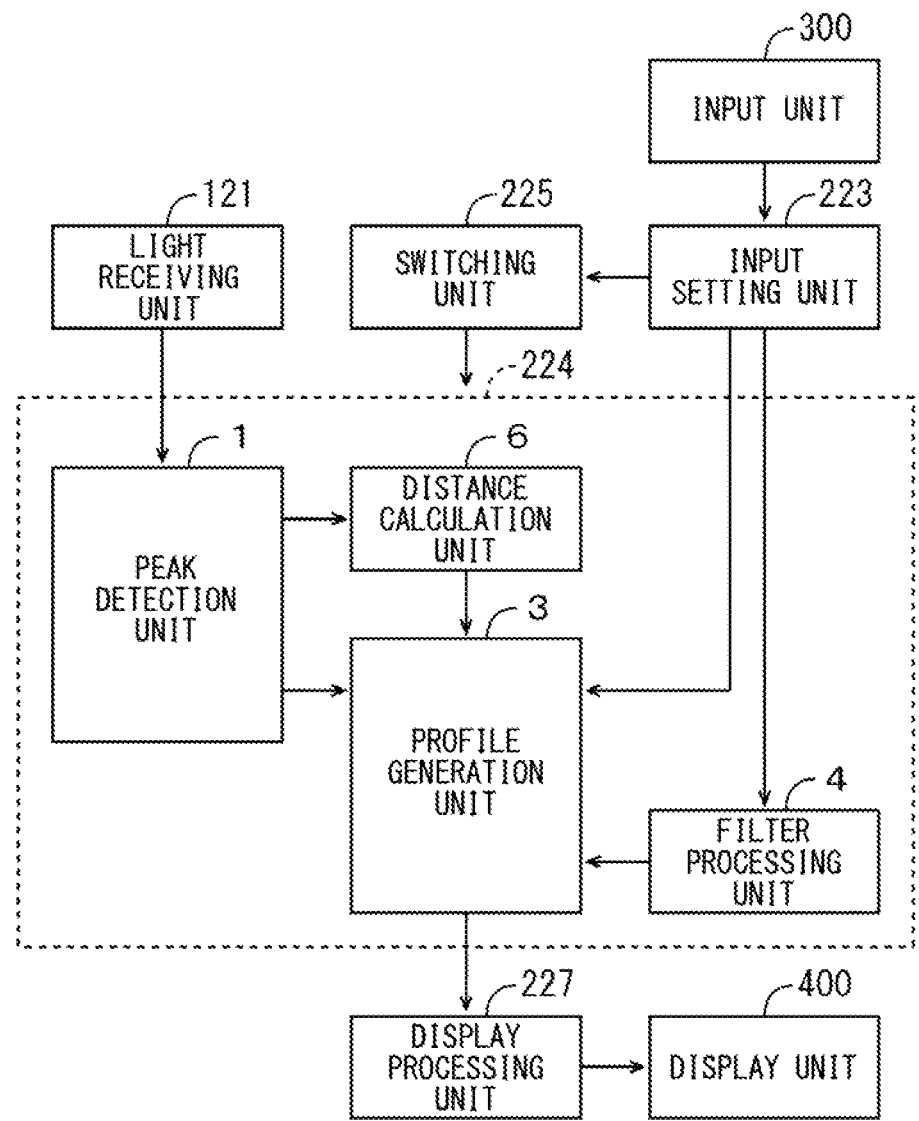
FIG. 18 is a block diagram showing a configuration of a profile acquisition unit according to a second embodiment.

Differences between the optical displacement meter 500 according to a second embodiment and the optical displacement meter 500 according to the first embodiment will be described. FIG. 18 is a block diagram showing a configuration of the profile acquisition unit 224 according to the second embodiment. As shown in FIG. 18, in the present embodiment, the profile acquisition unit 224 includes a distance calculation unit 6 instead of the cluster generation unit 2 of FIG. 12.

In the first operation mode, the distance calculation unit 6 calculates a distance between each peak candidate position of each pixel column SS and the peak position PP of an adjacent pixel column SS to the pixel column SS. The profile generation unit 3 selects the peak position PP from the plurality of peak candidate positions of each pixel column SS based on the distance calculated by the distance calculation unit 6. In the present embodiment, the peak candidate position having the smallest distance from the peak candidate position of the adjacent pixel column SS is selected as the peak position PP for each pixel column SS.

Figure 19:
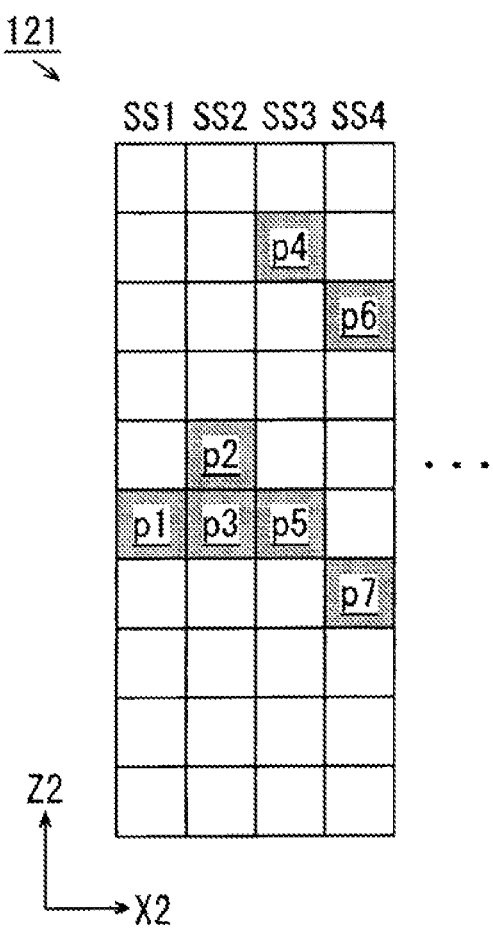
FIG. 19 is a diagram for describing an operation of the profile acquisition unit in a first operation mode according to the second embodiment.

FIG. 19 is a diagram for describing the operation of the profile acquisition unit 224 in the first operation mode according to the second embodiment. The peak detection unit 1 in FIG. 18 detects the peak candidate position of each pixel column SS. In the example of FIG. 19, the pixels p of the light receiving unit 121 corresponding to the detected peak candidate positions are indicated by the dot patterns.

Specifically, in the pixel column SS1, one peak candidate position is detected, and the pixel p corresponding to the peak candidate position is a pixel p1. In the pixel column SS2, two peak candidate positions are detected, and the pixels p corresponding to the peak candidate positions are pixels p2 and p3, respectively. In the pixel column SS3, two peak candidate positions are detected, and the pixels p corresponding to the peak candidate positions are pixels p4 and p5, respectively. In the pixel column SS4, two peak candidate positions are detected, and the pixels p corresponding to the peak candidate positions are pixels p6 and p7, respectively.

Hereinafter, the distance between each peak candidate position of each pixel column SS and the peak position PP of the adjacent pixel column SS to the pixel column SS will be described as the distance between the pixel corresponding to each peak candidate position and the pixel corresponding to the peak position PP. Since only one peak candidate position corresponding to the pixel p1 is detected in the pixel column SS1, the peak candidate position corresponding to the pixel p1 is selected as the peak position PP by the profile generation unit 3 of FIG. 18.

The distance between each of the pixels p2 and p3 in the pixel column SS2 and the pixel p1 in the pixel column SS1 adjacent to the pixel column SS2 is calculated by the distance calculation unit 6 in FIG. 18. In this example, the distance between the pixels p1 and p3 is shorter than the distance between the pixels p1 and p2. Therefore, the peak candidate position corresponding to the pixel p3 having the smallest distance from the pixel p1 in the adjacent pixel column SS1 is selected as the peak position PP by the profile generation unit 3 for the pixel column SS2.

Similarly, the distance between each of the pixels p4 and p5 in the pixel column SS3 and the pixel p3 in the pixel column SS2 adjacent to the pixel column SS3 is calculated by the distance calculation unit 6. In this example, the distance between the pixels p3 and p5 is shorter than the distance between the pixels p3 and p4. Therefore, the peak candidate position corresponding to the pixel p5 is selected as the peak position PP by the profile generation unit 3 for the pixel column SS3.

The distance between each of the pixels p6 and p7 in the pixel column SS4 and the pixel p5 in the pixel column SS3 adjacent to the pixel column SS4 is calculated by the distance calculation unit 6. In this example, the distance between the pixels p5 and p7 is shorter than the distance between the pixels p5 and p6. Therefore, the peak candidate position corresponding to the pixel p7 is selected as the peak position PP by the selection unit 3 for the pixel column SS4. The profile data is generated by the profile generation unit 3 of FIG. 18 based on the peak position PP selected for each pixel column SS.

As described above, in the present embodiment, when the plurality of peaks is detected in any pixel column SS, the profile generation unit 3 determines the relative positional relationship between the peak candidate position in the adjacent pixel column SS to the pixel column SS in the X2 direction and the plurality of detected peak candidate positions. In the determination of the relative positional relationship, the distance between each of the plurality of peak candidate positions of each pixel column SS and the peak candidate position of the adjacent pixel column SS to the pixel column SS in the X2 direction is calculated by the distance calculation unit 6. The relative positional relationship between the peak candidate positions is determined by the profile generation unit 3 based on the calculated distances. In this case, it is also possible to easily determine the relative positional relationship.

Although it has been described in the present embodiment that the peak candidate position having the smallest distance from the peak position PP in the adjacent pixel column SS is selected as the peak position PP for each pixel column SS, the present invention is not limited thereto. Similar to the modification example in FIG. 16, the profile acquisition unit 224 may further include the parameter acquisition unit 5. In this case, the profile generation unit 3 selects the peak position PP based on the comprehensive determination using the distance from the peak position PP in the adjacent pixel column SS calculated by the distance calculation unit 6 and the parameter acquired by the parameter acquisition unit 5.

[3] Third Embodiment

Figure 20:
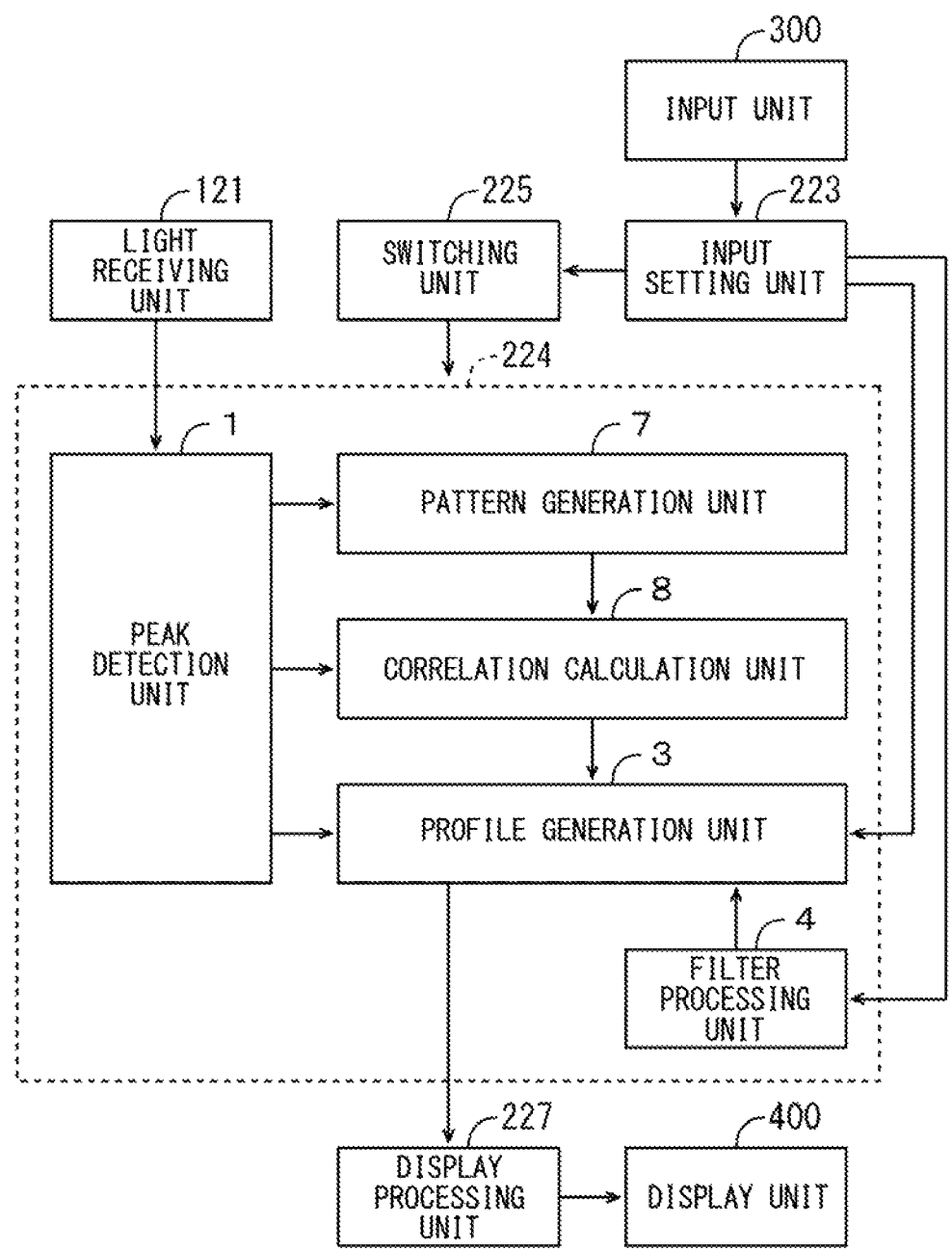
FIG. 20 is a block diagram showing a configuration of a profile acquisition unit according to a third embodiment.

Differences between the optical displacement meter 500 according to a third embodiment and the optical displacement meter 500 according to the first embodiment will be described. FIG. 20 is a block diagram showing a configuration of the profile acquisition unit 224 according to the third embodiment. As shown in FIG. 20, in the present embodiment, the profile acquisition unit 224 includes a pattern generation unit 7 and a correlation calculation unit 8 instead of the cluster generation unit 2 of FIG. 12.

In the first operation mode, the pattern generation unit 7 generates a geometric pattern based on the plurality of peak candidate positions detected by the peak detection unit 1. The geometric pattern includes a straight line, an arc, and the like. The correlation calculation unit 8 calculates a correlation coefficient between the geometric pattern generated by the pattern generation unit 7 and the plurality of peak candidate positions detected by the peak detection unit 1.

The profile generation unit 3 selects the peak position PP from the plurality of peak candidate positions of each pixel column SS based on the correlation coefficient calculated by the correlation calculation unit 8. In the present embodiment, the peak candidate position having the largest correlation coefficient with the generated geometric pattern is selected as the peak position PP for each pixel column SS.

Figure 21A:
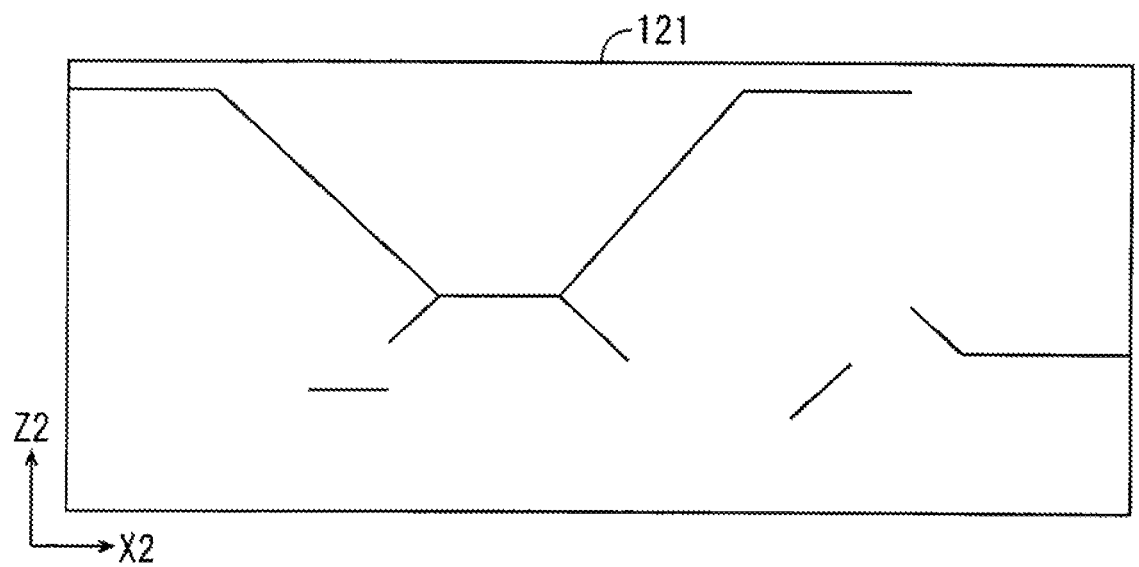
FIGS. 21A and 21B are diagrams for describing an operation of the profile acquisition unit in a first operation mode according to the third embodiment.
Figure 21B:
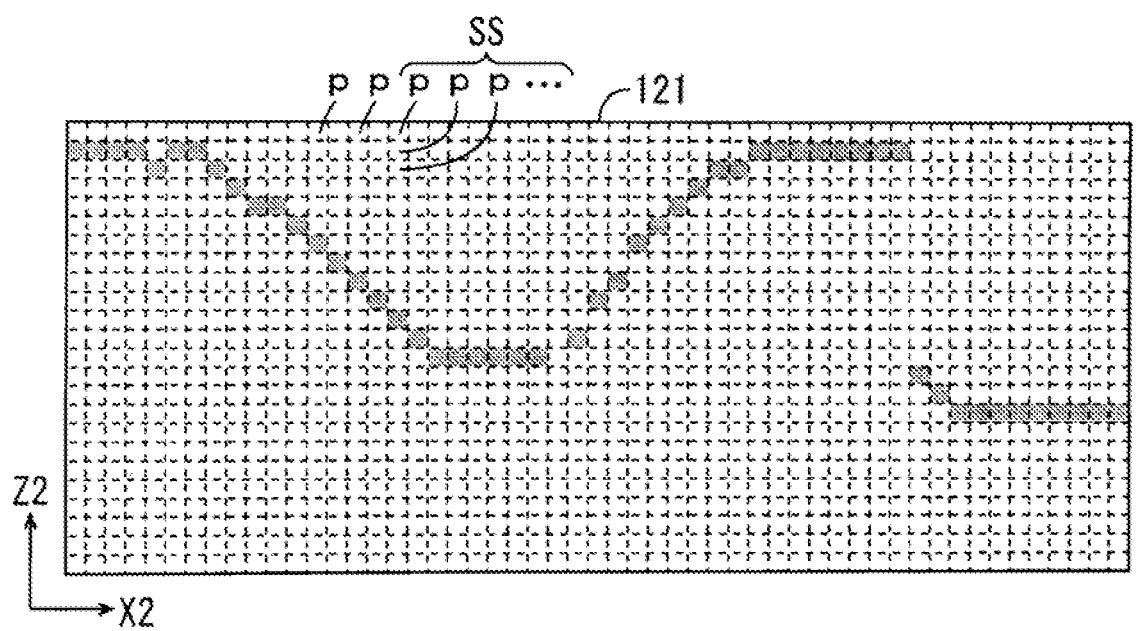

FIGS. 21A and 21B are diagrams for describing an operation of the profile acquisition unit 224 in the first operation mode according to the third embodiment. The peak detection unit 1 in FIG. 20 detects the peak candidate position of each pixel column SS. The peak candidate position detected in this example is the same as the peak candidate position shown in FIG. 13.

As shown in FIG. 21A, a straight-line geometric pattern is generated by the pattern generation unit 7 of FIG. 20 based on the plurality of peak candidate positions detected by the peak detection unit 1. In the example of FIG. 21A, the generation of the geometric pattern is performed in a state in which isolated peak candidate positions (the peak candidate positions corresponding to the clusters C2 to C9 of FIG. 14) which are not continuous with other peak candidate positions are excluded.

Next, the correlation coefficient between the geometric pattern of FIG. 21A generated by the pattern generation unit 7 and the plurality of peak candidate positions of FIG. 13 detected by the peak detection unit 1 is calculated by the correlation calculation unit 8 of FIG. 20. The peak candidate position having the largest correlation coefficient with the generated geometric pattern is selected as the peak position PP by the profile generation unit 3 of FIG. 20 For each pixel column SS. In the example of FIG. 21B, the pixels p of the light receiving unit 121 corresponding to the selected peak candidate positions are indicated by the dot patterns.

As described above, in the present embodiment, the profile generation unit 3 determines the relative positional relationship between at least the peak candidate position in the adjacent pixel column SS to the pixel column SS in the X2 direction and the plurality of detected peak candidate positions. In the determination of the relative positional relationship, the geometric pattern is generated by the pattern generation unit 7 based on the plurality of detected peak candidate positions. The correlation coefficient between the generated geometric pattern and the plurality of detected peak candidate positions is calculated by the correlation calculation unit 8 for each of the plurality of pixel columns SS. The relative positional relationship between the peak candidate positions is determined based on the calculated correlation coefficient. In this case, it is also possible to easily determine the relative positional relationship.

Although it has been described in the present embodiment that the peak candidate position having the largest correlation coefficient with the generated geometric pattern is selected as the peak position PP for each pixel column SS, the present invention is not limited thereto. Similar to the modification example in FIG. 16, the profile acquisition unit 224 may further include the parameter acquisition unit 5. In this case, the profile generation unit 3 selects the peak position PP based on the comprehensive determination using the correlation coefficient calculated by the correlation calculation unit 8 and the parameter acquired by the parameter acquisition unit 5.

[4] Correspondence Between Elements of Claims and Elements of Embodiments

Hereinafter, an example of correspondence between elements of Claims and the elements of the embodiments will be described, but the present invention is not limited to the following example. Various other elements having configurations or functions described in Claims may be used as the elements of Claims.

The workpiece W is an example of a measurement object, the optical displacement meter 500 is an example of an optical displacement meter, the light projecting unit 110 is an example of a light projecting unit, the X2 direction is an example of a first direction, and the Z2 direction is an example of a second direction. The pixel p is an example of a pixel, the pixel column SS is an example of a pixel column, the light receiving unit 121 is an example of a light receiving unit, and the peak detection unit 1 is an example of a peak detection unit.

The profile generation unit 3 is an example of a profile generation unit, the switching unit 225 is an example of a switching unit, the parameter acquisition unit 5 is an example of a parameter acquisition unit, and the cluster generation unit 2 is an example of a cluster generation unit. The distance calculation unit 6 is an example of a distance calculation unit, the pattern generation unit 7 is an example of a pattern generation unit, the correlation calculation unit 8 is an example of a correlation calculation unit, and the filter processing unit 4 is an example of a filter processing unit.

What is claimed is:

1. An optical displacement meter using an optical cutting method, which measures a profile of a measurement object, the meter comprising:
    a light projecting unit that irradiates the measurement object with slit light which spreads in a first direction or spot light scanned in the first direction;
    a light receiving unit that includes a plurality of pixels arranged in the first direction and a second direction intersecting with the first direction, receives reflected light from each position of the measurement object in the first direction, and outputs a light receiving amount distribution;
    a peak detection unit that detects one or a plurality of peak candidate positions of light receiving amounts in the second direction for each pixel column based on a plurality of the light receiving amount distributions respectively output from a plurality of the pixel columns arranged in the first direction;
    a profile generation unit that selects a peak position to be adopted to the profile from the peak candidate positions detected by the peak detection unit for each pixel column, and generates profile data indicating the profile based on the selected peak position; and
    a filter processing unit that performs filter processing on the profile data such that a smoothing effect at a portion of the profile at which a height change is smaller is larger than a smoothing effect at a portion at which the height change becomes larger.

2. The optical displacement meter according to claim 1, wherein the filter processing unit performs filter processing for each of a plurality of pixel columns based on a peak position in the second direction of a pixel column and a peak position in the second direction of each pixel column in a pre-specified certain range.

3. The optical displacement meter according to claim 1, wherein the filter processing unit performs filter processing for each of a plurality of pixel columns based on a position in the first direction and a peak position in the second direction of a pixel column, and a position in the first direction and a peak position in the second direction of each pixel column in a pre-specified certain range.

4. The optical displacement meter according to claim 1 further comprising:
    an input setting unit that specifies a range of the profile data to be subjected to the filter processing,
    wherein the filter processing unit performs filter processing on the profile data in the range specified by the input setting unit.

5. The optical displacement meter according to claim 1 further comprising:
    a parameter acquisition unit that acquires a parameter indicating a mode of a peak in the peak candidate position detected by the peak detection unit,
    wherein the profile generation unit selects the peak position to be adopted to the profile from the plurality of peak candidate positions in each light receiving amount distribution based on the parameter acquired by the parameter acquisition unit.

6. The optical displacement meter according to claim 5, wherein the parameter acquired by the parameter acquisition unit includes a light receiving amount of the peak or a width of the peak.

7. The optical displacement meter according to claim 1 further comprising:
    a measurement processing unit that performs measurement processing on the profile data filter-processed by the filter processing unit and calculates a dimension or a displacement of the measurement object;
    a display processing unit that generates image data indicating the dimension or the displacement of the measurement object calculated by the measurement processing unit.

8. An optical displacement meter using an optical cutting method, which measures a profile of a measurement object, the meter comprising:
    a light projector that irradiates the measurement object with slit light which spreads in a first direction or spot light scanned in the first direction;
    an image sensor that includes a plurality of pixels arranged in the first direction and a second direction intersecting with the first direction, receives reflected light from each position of the measurement object in the first direction, and outputs a light receiving amount distribution; and
    a processor in communication with a memory, the processor being configured to execute instructions stored in the memory that cause the processor to:
    detect one or a plurality of peak candidate positions of light receiving amounts in the second direction for each pixel column based on a plurality of the light receiving amount distributions respectively output from a plurality of the pixel columns arranged in the first direction;

select a peak position to be adopted to the profile from the peak candidate positions detected for each pixel column;

generate profile data indicating the profile based on the selected peak position; and perform filter processing on the profile data such that a smoothing effect at a portion of the profile at which a height change is smaller is larger than a smoothing effect at a portion at which the height change becomes larger.

9. A method to measure a profile of a measurement object, the method comprising:

irradiating the measurement object with slit light which spreads in a first direction or spot light scanned in the first direction;

receiving reflected light from each position of the measurement object in the first direction by a light receiving unit, wherein the light receiving unit includes a plurality of pixels arranged in the first direction and a second direction intersecting with the first direction;

outputting a light receiving amount distribution based on light receiving amounts output from a pixel column arranged in the first direction;

detecting one or a plurality of peak candidate positions of light receiving amounts in the second direction for each pixel column based on a plurality of the light receiving amount distributions respectively output from a plurality of the pixel columns arranged in the first direction;

selecting a peak position to be adopted to the profile from the peak candidate positions detected for each pixel column;

generating profile data indicating the profile based on the selected peak position; and performing filter processing on the profile data such that a smoothing effect at a portion of the profile at which a height change is smaller is larger than a smoothing effect at a portion at which the height change becomes larger.

\* \* \* \* \*